US008076031B1

(12) United States Patent
West et al.

(10) Patent No.: US 8,076,031 B1
(45) Date of Patent: Dec. 13, 2011

(54) ELECTROCHEMICAL DEVICE HAVING ELECTROLYTE INCLUDING DISILOXANE

(76) Inventors: Robert C. West, Madison, WI (US); Khalil Amine, Downers Grove, IL (US); Zhengcheng Zhang, Monona, WI (US); Qingzheng Wang, Bolingbrook, IL (US); Nicholas Agostino Antonio Rossi, Madison, WI (US); Donald R. Vissers, Naperville, IL (US)

( * ) Notice: Subject to any disclaimer, the term of this patent is extended or adjusted under 35 U.S.C. 154(b) by 1373 days.

(21) Appl. No.: 11/056,866

(22) Filed: Feb. 10, 2005

Related U.S. Application Data

(63) Continuation-in-part of application No. 10/971,507, filed on Oct. 21, 2004, now abandoned, and a continuation-in-part of application No. 10/962,125, filed on Oct. 7, 2004, now abandoned, and a continuation-in-part of application No. 10/810,019, filed on Mar. 25, 2004, now abandoned, and a continuation-in-part of application No. 10/810,080, filed on Mar. 25, 2004, now Pat. No. 7,588,859, and a continuation-in-part of application No. 10/810,081, filed on Mar. 25, 2004, now abandoned.

(60) Provisional application No. 60/543,898, filed on Feb. 11, 2004, provisional application No. 60/502,017, filed on Sep. 10, 2003, provisional application No. 60/543,951, filed on Feb. 11, 2004, provisional application No. 60/542,017, filed on Feb. 4, 2004.

(51) Int. Cl.
H01M 6/18 (2006.01)

(52) U.S. Cl. .................................................. 429/313
(58) Field of Classification Search .................. None
See application file for complete search history.

(56) References Cited

U.S. PATENT DOCUMENTS

| | | | |
|---|---|---|---|
| 3,172,899 A | 3/1965 | Bailey | |
| 3,530,159 A | 9/1970 | Guinet et al. | |
| 3,734,876 A | 5/1973 | Chu | |
| 4,259,467 A | 3/1981 | Keogh et al. | |
| 4,830,939 A | 5/1989 | Lee et al. | |
| 4,849,856 A | 7/1989 | Funari et al. | |
| 4,908,283 A | 3/1990 | Takahashi et al. | |
| 5,037,712 A | 8/1991 | Shackle et al. | |
| 5,112,512 A | 5/1992 | Nakamura | |
| 5,272,021 A | 12/1993 | Asai et al. | |
| 5,300,375 A | 4/1994 | Chaloner-Gill | |
| 5,362,493 A | 11/1994 | Skotheim et al. | |
| 5,419,984 A | 5/1995 | Chaloner-Gill et al. | |
| 5,475,127 A | 12/1995 | Klein et al. | |
| 5,538,812 A | 7/1996 | Lee et al. | |
| 5,593,787 A | 1/1997 | Dauth et al. | |
| 5,609,974 A | 3/1997 | Sun | |
| 5,633,098 A | 5/1997 | Narang et al. | |
| 5,690,702 A | 11/1997 | Skotheim et al. | |
| 5,700,300 A | 12/1997 | Jensen et al. | |
| 5,731,104 A | 3/1998 | Ventura et al. | |
| 5,753,389 A | 5/1998 | Gan et al. | |
| 5,772,934 A | 6/1998 | MacFadden | |
| 5,830,600 A | 11/1998 | Narang et al. | |
| 5,882,812 A | 3/1999 | Visco et al. | |
| 5,885,733 A | 3/1999 | Ohsawa et al. | |
| 5,919,587 A | 7/1999 | Mukherjee et al. | |
| 5,961,672 A | 10/1999 | Skotheim et al. | |
| 6,013,393 A | 1/2000 | Taniuchi et al. | |
| 6,015,638 A | 1/2000 | Ventura et al. | |
| 6,124,062 A | 9/2000 | Horie et al. | |
| 6,168,885 B1 | 1/2001 | Narang et al. | |
| 6,181,545 B1 | 1/2001 | Amatucci et al. | |
| 6,245,465 B1 | 6/2001 | Angell et al. | |
| 6,248,481 B1 | 6/2001 | Visco et al. | |
| 6,252,762 B1 | 6/2001 | Amatucci | |
| 6,268,088 B1 | 7/2001 | Oh et al. | |
| 6,337,383 B1 | 1/2002 | West et al. | |
| 6,447,952 B1 * | 9/2002 | Spiegel et al. | 429/218.1 |
| 6,482,912 B2 | 11/2002 | Boudjouk et al. | |
| 6,495,287 B1 | 12/2002 | Kolb et al. | |
| 6,573,009 B1 | 6/2003 | Noda et al. | |
| 6,610,109 B2 | 8/2003 | Noh | |
| 6,653,015 B2 | 11/2003 | Yoshida et al. | |
| 2002/0028388 A1 | 3/2002 | Lee | |
| 2002/0051911 A1 * | 5/2002 | Okada | 429/313 |
| 2002/0076619 A1 * | 6/2002 | Yamada et al. | 429/324 |
| 2002/0192554 A1 | 12/2002 | Woo et al. | |
| 2003/0036003 A1 | 2/2003 | Shchori et al. | |
| 2003/0099884 A1 | 5/2003 | Chiang et al. | |
| 2003/0104282 A1 | 6/2003 | Xing et al. | |
| 2003/0180624 A1 | 9/2003 | Oh et al. | |
| 2003/0180625 A1 | 9/2003 | Oh et al. | |
| 2003/0198869 A1 | 10/2003 | West et al. | |
| 2004/0197668 A1 | 10/2004 | Jung et al. | |

FOREIGN PATENT DOCUMENTS

EP 0 450 981 A1 10/1991

(Continued)

OTHER PUBLICATIONS

Official English Translation of JP 62209169, published Sep. 14, 1987.*
Definition of Siloxane retrieved from Dictionary.com on Oct. 20, 2009.*
Definition of the prefix "di-" retrieved from Dictionary.com on Oct. 20, 2009.*
M. Armand, New Electrode Material, Proceedings of the NATO Sponsored Advanced Study Institute on Fast Ion Transport in Solids, Solid State Batteries and Devices, 1972, Belgirate, Italy.
D. Fenton et al., Complexes of Alkali Metal Ions with Poly(Ethylene Oxide), Polymer, Nov. 1973, 589, 14.
S. Kohama et al., Alcoholysis of Poly(methylhydrogensiloxane), Journal of Applied Polymer Science, 1977, 21, 863-867.

(Continued)

Primary Examiner — Robert Hodge
(74) Attorney, Agent, or Firm — Joseph T. Leone, Esq.; DeWitt Ross & Stevens S.C.

(57) ABSTRACT

One example of the disiloxanes include a backbone with a first silicon and a second silicon. The first silicon is linked to a first substituent selected from a group consisting of: a first side chain that includes a cyclic carbonate moiety; a first side chain that includes a poly(alkylene oxide) moiety; and a first cross link links the disiloxane to a second siloxane and that includes a poly(alkylene oxide) moiety. In some instance, the second silicon is linked to a second substituent selected from a group consisting of: a second side chain that includes a cyclic carbonate moiety, and a second side chain that includes a poly(alkylene oxide) moiety.

3 Claims, 8 Drawing Sheets

FOREIGN PATENT DOCUMENTS

| | | |
|---|---|---|
| EP | 0 525 728 A1 | 2/1993 |
| EP | 0 581 296 A2 | 2/1994 |
| EP | 0 581 296 A3 | 2/1994 |
| EP | 0 922 049 B1 | 2/1998 |
| EP | 0 932 215 A1 | 1/1999 |
| EP | 0 796 511 B1 | 8/1999 |
| EP | 1 024 502 A1 | 8/2000 |
| EP | 0 932 215 B1 | 5/2001 |
| EP | 1 202 374 A1 | 5/2002 |
| JP | 57-034661 | 2/1982 |
| JP | 57-034662 | 2/1982 |
| JP | 57-080670 | 5/1982 |
| JP | 57-111957 | 7/1982 |
| JP | 57-176669 A2 | 10/1982 |
| JP | 59-224072 A2 | 12/1984 |
| JP | 60-195877 | 10/1985 |
| JP | 60-216461 | 10/1985 |
| JP | 61-288374 | 12/1986 |
| JP | 62-209169 A2 | 9/1987 |
| JP | 63-010466 | 1/1988 |
| JP | 63-310569 | 12/1988 |
| JP | 02-080462 | 3/1990 |
| JP | 02-262274 | 10/1990 |
| JP | 02-291603 | 12/1990 |
| JP | 03-139566 | 6/1991 |
| JP | 60-052893 A2 | 7/1992 |
| JP | 05-036441 | 2/1993 |
| JP | 05-290616 | 11/1993 |
| JP | 07-320782 | 12/1995 |
| JP | 08-078053 A2 | 3/1996 |
| JP | 96/21953 | 7/1996 |
| JP | 09-306544 | 11/1997 |
| JP | 11-214032 A2 | 1/1998 |
| JP | 10-172615 A2 | 6/1998 |
| JP | 11-185804 | 7/1999 |
| JP | 11-238523 | 8/1999 |
| JP | 11-302383 | 11/1999 |
| JP | 11-302384 A2 | 11/1999 |
| JP | 11-306856 A2 | 11/1999 |
| JP | 11-306857 A2 | 11/1999 |
| JP | 2000-058123 | 2/2000 |
| JP | 2000-154254 A2 | 6/2000 |
| JP | 2000-222939 A2 | 8/2000 |
| JP | 2000-277152 A2 | 10/2000 |
| JP | 2001-068115 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-063936 A2 | 2/2002 |
| JP | 2002-151150 A2 | 5/2002 |
| JP | 2002155142 A2 | 5/2002 |
| JP | 2002-298913 A2 | 10/2002 |
| JP | 2002-343440 A2 | 11/2002 |
| JP | 2003-002974 A2 | 1/2003 |
| JP | 2004-235141 | 8/2004 |
| WO | WO 98/07729 A1 | 2/1998 |
| WO | WO 00/00495 A1 | 1/2000 |
| WO | WO 00/08654 | 2/2000 |
| WO | WO 00/25323 A1 | 5/2000 |
| WO | WO 01/73884 A1 | 10/2001 |
| WO | WO 01/96446 A1 | 12/2001 |
| WO | WO 01/99209 A2 | 12/2001 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

E. Tsuchida et al., Conduction of Lithium Ions in Polyvinylidene Fluoride and its Derivates-I, Electrochimica Acta, 1983, 591-595, 28(5).

L. Hardy et al., Chloride Ion Conductivity in a Plasticized Quaternary Ammonium Polymer, Macromolecules, 1984, 975-977, 17.

P. Blonsky et al., Polyphosphazene Solid Electrolytes, Journal of American Chemical Society, 1984, 6854-6855, 106.

D. Bannister et al., A Water-Soluble Siloxane: Poly(ethylene glycol) Comb Polymer, Journal of Polymer Science: Polymer Letters Edition, 1985, 465-467, 23.

I. Kelly et al., Poly(Ethylene Oxide) Electrolytes for Operation at Near Room Temperature, Journal of Power Sources, 1985, 13-21, 14.

D. Fish et al., Conductivity of Solid Complexes of Lithium Perchlorate with Poly{[w-methoxyhexa(oxyethylene)ethoxy]methylsiloxane} [a], Makromol. Chem., Rapid Commun., 1986, 115-120, 7.

P. Hall et al. Ion Conductivity in Polysiloxane Comb Polymers With Ethylene Glycol Teeth, Polymer Communications, 1986, 3 pages, 27.

D.R. MacFarlane et al., Synthesis and Aqueous Solution Phase Behavior of Siloxane-Poly (Alkylene Glycol) Comb Copolymers, Department of Chemistry, Monash University, Clayton, Victoria, Australia, *Polymer Preprints*, 1987, 28, 405-406.

D. Fish et al., Polymer Electrolyte Complexes of $ClO_4$ and Comb Polymers of Siloxane with Oligo-oxyethylene Side Chains, British Polymer Journal, 1988, 281-288, 20, 3.

S. Ganapathiappan et al., A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules, 1988, 2684-2689, 21.

R. Spindler et al., Investigations of a Siloxane-Based Polymer Electrolyte Employing $^{13}C$, $^{29}Si$, $^{7}Li$, and $^{23}Na$ Solid State NMR Spectroscopy, Journal of American Chemical Society, 1988, 3036-3043, 110.

R. Spindler et al., Synthesis NMR Characterization, and Electrical Properties of Siloxane-Based Polymer Electrolytes, Macromolecules, 1988, 648-654, 21.

S. Ganapathiappan et al., Synthesis, Characterization and Electrical Response of Phosphazene Polyelectrolytes, Journal of America Chemical Society, 1989, 4091-4095, 111.

M. Ouchi et al., Convenient and Efficient Tosylation of Oligoethylene Glycois and the Related Alcohols in Tetrahydrofuran-Water in the Presence of Sodium Hydroxide, The Chemical Society of Japan, 1990, 1260-1262, 63, 4.

L. Dominey et al., Thermally Stable Lithium Salts for Polymer Electrolytes, Electrochimica Acta, 1992, 1551-1554, 37(9).

F. Alloin et al., Triblock Copolymers and Networks Incorporating Oligo (Oxyethylene) Chains, Solid State Ionics, 1993, 3-9, 60.

C. St. Pierre et al., Lithium-Metal-Polymer Battery for Electric Vehicle and Hybrid Electric Vehicle Applications www.avestor.com/en/automotive.html, info@avestor.com, 1993, 11 pages.

G. Zhou et al., Solvent-Free Cation-Conduction Polysiloxane Electrolytes with Pendant Oligo(oxyethylene) and Sulfonate Groups, Macromolecules, 1993, 2202-2208, 26.

M. Gauthier et al., Large Lithium Polymer Battery Development the Immobile Solvent Concept, Journal of Power Sources, 1995, 163-169, 54.

H. Allcock et al., Polyphosphazenes Bearing Branched and Linear Oligoethyleneoxy Side Groups as Solid Solvents for Ionic Conduction, Macromolecules, 1996, 7544-7552, 29.

K. Abraham et al., Highly Conductive PEO-Like Polymer Electrolytes, Journal of Chemical Materials, 1997, 1978-1988, 9(9).

M. Furlani et al., Time Resolved Luminescence and Vibrational Spectroscopic Studies on Complexes of Poly(Ethylene Oxide) Oligomers and $Eu(TFSI)_3$ Salt, 11th International Conference on Solid State Ionics, 1997, 10 pages.

J. Gnanaraj et al., Studies on Comb-like Polymer Blend with Poly(Ethylene Oxide)—Lithium Perchlorate Salt Complex Electrolyte, Polymer, 1997, 3709-3712, 38(14).

F. Gray, Polymer Electrolytes, RSC Materials Monographs, UK, 1997, 46-49.

C. Letourneau et al., Progress in Lithium-Metal-Polymer Battery System for Electric Vehicles, http://www.avestor.com/iactivefiles/evs15.pdf, info@avestor.com, INTELEC, Oct. 1998, Canada, 1-10.

J. Blackwell et al., $B(C_8F_5)_3$-Catalyzed Silation of Alcohols: A Mild, General Method for Synthesis for Silyl Ethers, Journal of Organic Chemistry, 1999, 4887-4892, 64.

R. Hooper et al., A Highly Conductive Solid-State Polymer Electrolyte Based on a Double-Comb Polysiloxane Polymer with Oligo(Ethylene Oxide) Side Chains, Organometallics, American Chemical Society, 1999, 3249-3251, 18(17).

Z. Wang et al., Thermal, Electrochemical, and Spectroscopic Characterizations of Hyperbranched Polymer Electrolyte, Journal of Electrochemical Society, 1999, 2209-2215, 146(6).

M. Anderman et al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol),, Dimethacrylates—Thermal, Mechanical and Electrochemical Properties in Relationship to the Network Structure, Polymer, 2000, 3821-3836, 41.

R. Hooper et al., Highly Conductive Siloxane Polymers, Macromolecules, 2001, 931-936, 34.

X. Hou et al., Novel Interpenetrating Polymer Network Electrolytes, Polymer, 2001, 4181-4188, 42.

C.F. Rome, The Unique Properties of Silicone at the Service of the Petroleum Industry, Hydrocarbon Asia, 2001, 42-49, 'www.hcasia.safan.com/mag/may-jun01/Tech-Silicone.pdf'.

W. Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).

W. Xu et al., Ionic Conductivity and Electrochemical Properties of Lithium Orthoborate Salts, http://www.electrochem.org/meetings/past/200/abstracts/symposia/bla/0107.pdf, United States, Sep. 5, 2001.

N. Katayama et al., Thermal Stability of Propylene Carbonate and Ethylene Carbonate-Propylene Carbonate-Based Electrolytes for Use in Li Cells, Journal of Power Sources, 2002, 1-6, 4769, http://www.sciencedirect.com/web-editions.

K. Xu et al., LiBOB as Salt for Lithium-Ion Batteries, Electrochemical and Solid State Letters, 2002, pp. A26-A29, vol. 5(1).

J. Alper, The Battery: Not Yet a Terminal Case, Science, May 2002, 1224-1226, vol. 296, www.sciencemag.org.

Y. Kang et al., Solid Polymer Electrolytes based on Cross-linked Siloxane-g-oligoethylene oxide: Ionic conductivity and Electrochemical Properties, Abstract book of 11th International Meeting on Lithium Batteries (IMLB 11), Jun. 23-28, 2002.

B. Oh et al., New Interpenetrating Electrolyte Network-Type Siloxane Polymer Electrolyte, Electrochemical and Solid State Letters, 2002, E59-E61, 5(11), The Electrochemical Society, Inc., Sep. 11, 2002.

T. Fujii et al., Application of LiBOB as an Electrolyte Salt for 4 V Class Lithium Ion Rechargeable Cells, whttp://www2.electrochem.org/cgi-bin/abs?mtg=202&abs=0203, Oct. 24, 2002, United States.

W. Xu et al., Structures of Orthoborate Anions and Physical Properties of Their Lithium Salt Nonaqueous Solutions, Journal of the Electrochemical Society, 2003, 1-0, 150(1).

International Search Report, dated May 1, 2003, received in relation to Application No. PCT/US03/02127.

Y. Kang et al., Solid Polymer Electrolytes Based on Cross-Linked Polysiloxane-g-oligo(ethylene oxide): Ionic Conductivity and Electrochemical Properties, *Journal of Power Sources* 119-121 (Jun. 1, 2003), pp. 448-453.

International Search Report, dated Jul. 11, 2003, received in relation to Application No. PCT/US03/02128.

International Search Report, dated Jul. 11, 2003, received in relation to Application No. PCT/US03/08740.

International Search Report, dated Sep. 12, 2003, received in relation to Application No. PCT/US03/08784.

International Search Report, dated Oct. 9, 2003, received in relation to Application No. PCT/US03/08779.

International Search Report, dated Oct. 9, 2003, received in relation to Application No. PCT/US03/08783.

Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.

NICODOM Ltd., Inorganic Library of FT-IR Spectra Inorganics II—Boron Compounds, homepage, website http://www.ftir.cz/INLIB2.html and http://www.ftir.cz/home_page_of_nicodom_sro.htm.

R. Zhang et al., Modification of Polymethylhydrosiloxane by Dehydrocoupling Reactions Catalyzed by Transition Metal Complexes: Evidence for the Preservation of Linear Siloxane Structures, Silicon Chemistry, 2003, vol. 2, 271-277.

Z. Zhang et al., Network-Type Ionic Conductors Based on Oligoethyleneoxy-Functionalized Pentamethylcyclopentasiloxanes, Macromolecules, 2005, vol. 38, 5714-5720.

Z. Zhang et al., Synthesis and Ionic Conductivity of Cyclosiloxanes with Ethyleneoxy-Containing Substituents, Chem. Mater., 2005, vol. 17, 5646-5650.

M. Ue, Recent Technological Trend in Electrolyte Materials for Li-ion Batteries, Abstract 31, International Meeting on Lithium Batteries (IMLB 12), 2004, The Electrochemical Society, Inc.

* cited by examiner

ELECTROCHEMICAL DEVICE HAVING ELECTROLYTE INCLUDING DISILOXANE

REFERENCE TO RELATED APPLICATIONS

This application claims the benefit of U.S. Provisional Patent Application Ser. No. 60/543,951, filed on Feb. 11, 2004 and entitled "Siloxanes" and of U.S. Provisional Patent Application Ser. No. 60/543,898, filed on Feb. 11, 2004 and entitled "Siloxane Based Electrolytes for Use in Electrochemical Devices;" and of U.S. Provisional Patent application Ser. No. 60/542,017, filed on Feb. 4, 2004, entitled "Non-aqueous Electrolyte Solvents for Electrochemical Devices;" and this application is a continuation-in-part of U.S. patent application Ser. No. 10/810,081, filed on Mar. 25, 2004 now abandoned and entitled "Electrolyte Including Polysiloxane with Cyclic Carbonate Groups," which claims the benefit of Provisional U.S. Patent Application Ser. No. 60/502,017, filed on Sep. 10, 2003, and entitled "Electrolyte Including Polysiloxane with Cyclic Carbonate Groups;" and this application is a continuation-in-part of U.S. Provisional patent application Ser. No. 10/810,019, filed on Mar. 25, 2004 and entitled "Polysiloxane for Use in Electrochemical Cells;" and this application is a continuation-in-part of U.S. patent application Ser. No. 10/810,080, filed on Mar. 25, 2004, now U.S. Pat. No. 7,588,859 entitled "Electrolyte Use in Electrochemical Devices;" and this application is a continuation-in-part of U.S. patent application Ser. No. 10/962,125, filed on Oct. 7, 2004 now abandoned and entitled "Battery Having Electrolyte Including One or More Additives;" and this applications is a continuation-in-part of U.S. patent application Ser. No. 10/971,507, filed on Oct. 21, 2004, now abandoned and entitled "Electrochemical Device Having Electrolyte Including Disiloxane;" each of which is incorporated herein in its entirety. U.S. patent application Ser. No. 10/971,912, filed Oct. 21, 2004, and entitled "Battery Having Electrolyte Including Organoborate Salt" is incorporated herein in its entirety.

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144LM01, Subcontract No. AGT DTD Sep. 9, 2002.

FIELD

The present invention relates to electrolytes for electrochemical devices, and more particularly to electrolytes that include disiloxanes.

BACKGROUND

The increased demand for lithium batteries has resulted in research and development to improve the safety and performance of these batteries. Many batteries employ organic carbonate electrolytes associated with high degrees of volatility, flammability, and chemical reactivity. A variety of polysiloxane-based electrolytes have been developed to address these issues. However, polysiloxane based electrolytes typically have a low ionic conductivity and/or cycling performance that limits their use to applications that do not require high rate performance.

SUMMARY

Disiloxanes for use in the electrolytes of electrochemical devices are disclosed. An example disiloxane includes a backbone with a first silicon and a second silicon. The first silicon is linked to a first substituent that includes a poly(alkylene oxide) moiety or a cyclic carbonate moiety. For instance, the first silicon can be selected from a group consisting of a first side-chain that includes a poly(alkylene oxide) moiety, a first side-chain that includes a cyclic carbonate moiety or a cross link that includes a poly(alkylene oxide) moiety and that cross-links the disiloxane to a second siloxane. In some instances, the disiloxanes include no more than one poly(alkylene oxide) moiety and/or no more than one cyclic carbonate moiety. For instance, the entities linked to the first silicon and the second silicon, other than the first substituent, can each exclude a poly(alkylene oxide) moiety and/or a cyclic carbonate moiety. In some instances, the disiloxane excludes a poly(alkylene oxide) moieties or excludes cyclic carbonate moieties.

The second silicon can be linked to a second substituent selected from a group consisting of a second side-chain that includes a poly(alkylene oxide) moiety and a second side-chain that includes a cyclic carbonate moiety. In some instances, the disiloxanes include no more than two poly(alkylene oxide) moieties and/or no more than two cyclic carbonate moieties. For instance, the entities linked to the first silicon and the second silicon, in addition to the first substituent and the second substituent, can each exclude a poly(alkylene oxide) moiety and/or a cyclic carbonate moiety.

The disiloxanes can represented by the following formula I:

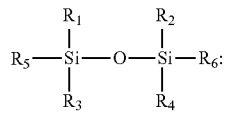

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by formula I-A, formula I-B, or formula I-C; $R_6$ is an alkyl group, an aryl group, represented by formula I-D, or represented by formula I-E.

Formula I-A:

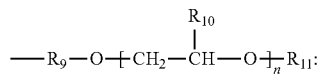

wherein $R_9$ is nil or a spacer; $R_{10}$ is hydrogen; alkyl or aryl; $R_{11}$ is alkyl or aryl; and n is 1 to 12.

Formula I-B:

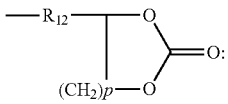

wherein $R_{12}$ is an organic spacer and p is 1 to 2. The spacer can be an organic spacer and can include one or more —$CH_2$— groups.

Formula I-C:

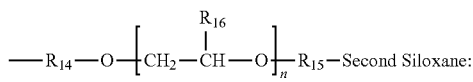

where $R_{14}$ is nil or a spacer; $R_{15}$ is nil or a spacer; $R_{16}$ is hydrogen, alkyl or aryl; second siloxane represents another siloxane and n is 1 to 12.

Formula I-D:

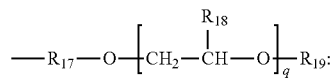

wherein $R_{17}$ is nil or a spacer; $R_{18}$ is hydrogen; alkyl or aryl; $R_{19}$ is alkyl or aryl; and q is 1 to 12.

Formula I-E:

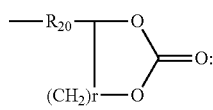

wherein $R_{20}$ is an organic spacer and p is 1 to 2.

In the disiloxanes illustrated in Formula I: $R_5$ can represent Formula I-A or Formula I-B; or $R_5$ can represent Formula I-A or Formula I-C; or $R_5$ can represent Formula I-B or Formula I-C. Additionally or alternately: $R_6$ can represent an alkyl group or an aryl group or Formula I-D; or $R_6$ can represent an alkyl group or an aryl group or Formula I-E. In some instances, $R_1$, $R_2$, $R_3$ and $R_4$ are each an alkyl group. For instance, $R_1$, $R_2$, $R_3$ and $R_4$ can each be a methyl group.

Novel disiloxanes are also disclosed. In one example of a novel disiloxanes, the first silicon is linked to a first side chain that includes a poly(alkylene oxide) moiety. The poly(alkylene oxide) moiety includes an oxygen connected directly to the first silicon. Additionally, the second silicon is linked to a second side chain that includes a poly(alkylene oxide) moiety. In some instances, the poly(alkylene oxide) moiety included in the second side chain includes an oxygen directly linked to the second silicon.

In another example of a novel disiloxanes, the first silicon is linked to a cross link that includes a poly(alkylene oxide) moiety and that cross-links the disiloxane to a second siloxane. In some instances, the second siloxane is a disiloxane or a trisiloxane. When the second siloxane is a trisiloxane, the central silicon can be linked to the cross-link. In some instances, the cross link includes an organic spacer connecting the poly(alkylene oxide) moiety to the first silicon and/or an organic spacer connecting the poly(alkylene oxide) moiety to the backbone of the second siloxane. In some instances, the poly(alkylene oxide) moiety includes an oxygen linked directly to the first silicon and/or an oxygen linked directly to the backbone of the second siloxane.

In another example of a novel disiloxanes, the first silicon is linked to one or more side chains that includes a carbonate moiety and/or linked to one or more side chains that include poly(alkylene oxide) moiety with an oxygen linked to the first silicon. When the first silicon is linked to a side chain that includes a poly(alkylene oxide) moiety, the entities linked to the second silicon can each exclude a carbonate moiety and/or a poly(alkylene oxide) moiety. When the first silicon is linked to a side chain that includes carbonate moiety, the entities linked to the second silicon can each exclude a carbonate moiety and/or a poly(alkylene oxide) moiety.

Electrolytes that include one or more salts dissolved in a solvent that includes one or more of the above disiloxanes are also disclosed. The electrolytes can optionally include a polymer that interacts with one or more of the disiloxanes so as to form an interpenetrating network. The electrolyte can optionally include one or more solid polymers that are each a solid polymer when standing alone at room temperature. The electrolyte can optionally include one or more silanes and/or one or more additives and/or one or more siloxanes having a backbone with more than three silicons or less than three silicons.

Electrochemical devices that employ the electrolytes are also disclosed. The electrochemical devices include one or more anodes and one or more cathodes activated by the electrolyte. Methods of generating the above siloxanes, electrolytes and electrochemical devices are also disclosed.

DESCRIPTION

Figure 1:
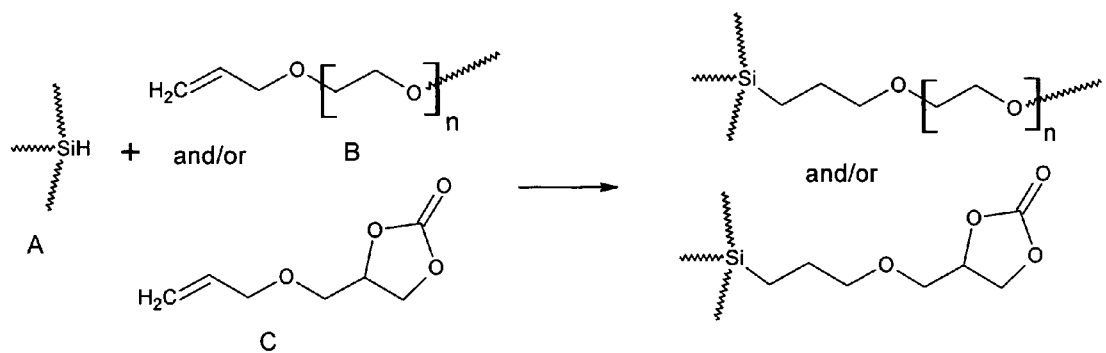
FIG. 1 illustrates a hydrosilylation reaction suitable for generating the disiloxanes.

Electrochemical devices with an electrolyte that includes one or more salts dissolved in a solvent that includes a disiloxane is disclosed. The disiloxanes include a backbone with a first silicon and a second silicon. A first substituent linked to the first silicon can include a poly(alkylene oxide) moiety or a cyclic carbonate moiety. For instance, the first substituent can be a first side-chain that includes a poly(alkylene oxide) moiety, a first side-chain that includes a cyclic carbonate moiety or a cross link that includes a poly(alkylene oxide)

moiety and that cross-links the disiloxane to a second siloxane. In some instances, a second substituent linked to the second silicon is a second side chain that includes a cyclic carbonate moiety, or a second side chain that includes a poly(alkylene oxide) moiety.

These disiloxanes can yield an electrolyte with a lower viscosity than polysiloxane based electrolytes. The reduction in viscosity can improve wetting of electrodes in an electrochemical device enough to enhance the homogeneity of the electrolyte distribution in the cell. Surprisingly, the enhanced homogeneity can be sufficient to increase the capacity and cycling properties of batteries. For instance, these electrolytes can, in some instances, yield a battery having greater than 90% discharge capacity retention after cycle number 100 when the device is repeatedly cycled between 2.7 V and 4.1V after formation of a passivation layer. As a result, the electrolytes can be suitable for use in batteries such as high-energy and long cycle life lithium secondary batteries, such as biomedical devices, and satellite applications.

The electrolytes can also have high ionic conductivities in addition to the enhanced capacity and cycling properties. For instance, the first substituent and the second substituent can each include a poly(alkylene oxide) moiety. The poly(alkylene oxide) moieties can help dissolve lithium salts that are employed in batteries. Accordingly, the disiloxanes can provide an electrolyte with a concentration of free ions suitable for use in batteries. Additionally, the one or more poly(alkylene oxide) moieties can enhance the ionic conductivity of the electrolyte at room temperatures. For instance, these disiloxanes can yield an electrolyte with an ionic conductivity higher than $1.0 \times 10^{-4}$ S/cm at 24° C. or higher than $1.1 \times 10^{-4}$ S/cm at 24° C.

In some instances, the first substituent and the second substituent each include a cyclic carbonate moiety. The carbonate moieties can have a high ability to dissolve the salts that are employed in electrolytes. As a result, the carbonates can provide high concentrations of free ions in the electrolyte and can accordingly increase the ionic conductivity of the electrolyte. For instance, these disiloxanes can yield an electrolyte with an ionic conductivity higher than $1.0 \times 10^{-4}$ S/cm at 24° C. or higher than $1.1 \times 10^{-4}$ S/cm at 24° C.

In some instances, the first substituent includes a poly(alkylene oxide) moiety and the second substituent includes a cyclic carbonate moiety. The ability of the carbonates to provide high concentrations of free ions in the electrolyte can work in conjunction with the poly(alkylene oxide) moiety to increase the ionic conductivity of the electrolyte. For instance, these disiloxanes can yield an electrolyte with an ionic conductivity higher than $1.0 \times 10^{-4}$ S/cm at 24° C. or higher than $1.0 \times 10^{-4}$ S/cm at 24° C.

As an alternative to being a liquid, the electrolyte can be a solid or a gel. For instance, the electrolyte can include a cross-linked network polymer that forms an interpenetrating network with the disiloxane. An electrolyte that includes an interpenetrating network can be a solid or a gel. Accordingly, the interpenetrating network can serve as a mechanism for providing a solid electrolyte or a gel electrolyte. Alternately, the electrolyte can include one or more solid polymers in addition to the disiloxane. The one or more solid polymers are a solid when standing alone at room temperature. The solid polymer can be employed to generate a gel electrolyte or a solid electrolyte such as a plasticized electrolyte.

When the first substituent includes a poly(alkylene oxide) moiety, the poly(alkylene oxide) can include an oxygen linked directly to the first silicon or a spacer can be positioned between the poly(alkylene oxide) moiety and the first silicon. A spacer can enhance stability while removing the spacer can reduce viscosity and enhance conductivity. Additionally or alternately, when the second substituent includes a poly(alkylene oxide) moiety, the poly(alkylene oxide) can include an oxygen linked to the first silicon or a spacer can be positioned between the poly(alkylene oxide) moiety and the first silicon. Suitable spacers for use with the first substituent and/or the second substituent include, but are not limited to, organic spacers. One or more of the poly(alkylene oxide) moieties can be an oligo(alkylene oxide) moieties. In some instances, one or more of the poly(alkylene oxide) moieties is a poly(ethylene oxide) moiety.

When a silicon is linked to a substituent that includes a cyclic carbonate moiety, a spacer can link the carbonate moiety to the silicon or an oxygen can link the cyclic carbonate moiety to the silicon. The spacer can be an organic spacer.

An example of the disiloxane includes a backbone with a first silicon and a second silicon. The first silicon is linked to a first substituent that includes a poly(alkylene oxide) moiety or a cyclic carbonate moiety. The first substituent can be selected from a group consisting of a first side-chain that includes a poly(alkylene oxide) moiety, a first side-chain that includes a cyclic carbonate moiety or a cross link that includes a poly(alkylene oxide) moiety and that cross links the disiloxane to a second siloxane wherein side chains are exclusive of cross links. As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, the disiloxanes can include no more than one poly(alkylene oxide) moiety and/or no more than one cyclic carbonate moiety. For instance, the entities linked to the first silicon and the second silicon, other than the first substituent, can each exclude a poly(alkylene oxide) moiety and/or a cyclic carbonate moiety. In some instances, the disiloxane excludes a poly(alkylene oxide) moieties or excludes cyclic carbonate moieties.

The second silicon can be linked to a second substituent selected from a group consisting of a second side-chain that includes a poly(alkylene oxide) moiety, a second side-chain that includes a cyclic carbonate moiety, an aryl group or an alkyl group. In some instances, the second substituent is selected from a group consisting of a second side-chain that includes a poly(alkylene oxide) moiety and a second side-chain that includes a cyclic carbonate moiety. As noted above, the viscosity of an electrolyte can increase undesirably and/or the ionic conductivity of an electrolyte can decrease undesirably as the number of substituents that include a poly(alkylene oxide) moiety and/or a cyclic carbonate moiety increases. As a result, the disiloxanes can include no more than two poly(alkylene oxide) moiety and/or no more than two cyclic carbonate moiety. For instance, the entities linked to the first silicon and the second silicon, in addition to the first substituent and the second substituent, can each exclude a poly(alkylene oxide) moiety and/or a cyclic carbonate moiety.

Formula I provides an example of a suitable disiloxane.

Formula I:

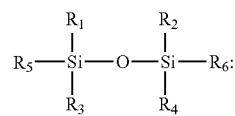

wherein $R_1$ is an alkyl group or an aryl group; $R_2$ is an alkyl group or an aryl group; $R_3$ is an alkyl group or an aryl group;

$R_4$ is an alkyl group or an aryl group; $R_5$ is represented by Formula I-A, Formula I-B or Formula I-C; $R_6$ is an alkyl group, an aryl group, represented by Formula I-D, or represented by Formula I-E.

Formula I-A:

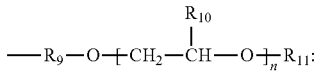

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.

Formula I-B:

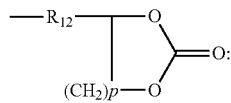

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the disiloxane. In another example, $R_{12}$ is a alkylene oxide moiety represented by: —$CH_2$—O— with the oxygen linked to a silicon on the backbone of the disiloxane.

Formula I-C:

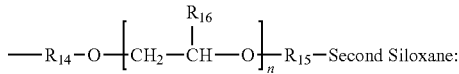

where $R_{14}$ is nil or a spacer; $R_{15}$ is nil or a spacer; $R_{16}$ is hydrogen, alkyl or aryl; second siloxane represents another siloxane and n is 1 to 12. The spacers can be organic spacers and can include one or more —$CH_2$— groups. Other suitable spacers can include an alkylene, alkylene oxide or a bivalent ether group. These spacers can be the same or different and can be substituted or unsubstituted. The above spacers can be completely or partially halogenated. For instance, the above spacers can be completely or partially fluorinated. In one example, $R_{14}$ and $R_{15}$ are each represented by: —$(CH_2)_3$—.

Formula I-D:

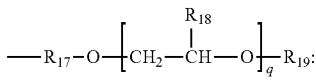

wherein $R_{17}$ is nil or a spacer; $R_{18}$ is hydrogen; alkyl or aryl; $R_{19}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{17}$ is represented by: —$CH_2$—O—$(CH_2)_3$— with the —$(CH_2)_3$— linked to a silicon on the backbone of the disiloxane.

Formula I-E:

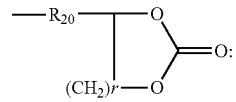

wherein $R_{20}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{20}$ is a bivalent ether moiety represented by: —$CH_2$—O—$(CH_2)_3$— with the —$(CH_2)_3$— linked to a silicon on the backbone of the disiloxane. In another example, $R_{20}$ is a alkylene oxide moiety represented by: —$CH_2$—O— with the oxygen linked to a silicon on the backbone of the disiloxane.

In the disiloxanes illustrated in Formula I: $R_5$ can represent Formula I-A or Formula I-B; or $R_5$ can represent Formula I-A or Formula I-C; or $R_5$ can represent Formula I-B or Formula I-C. Additionally or alternately: $R_6$ can represent an alkyl group or an aryl group or Formula I-D; $R_6$ can represent an alkyl group or an aryl group or Formula I-E. In some instances, $R_1$, $R_2$, $R_3$ and $R_4$ are each an alkyl group. For instance, $R_1$, $R_2$, $R_3$ and $R_4$ can each be a methyl group.

In one example of the disiloxane, the first substituent is a side chain that includes a poly(alkylene oxide) moiety. The poly(alkylene oxide) moiety can include an oxygen linked directly to the first silicon. For instance, the disiloxanes can be represented by Formula I with $R_5$ represented by Formula I-A and $R_9$ as nil. Alternately, a spacer can link the poly(alkylene oxide) moiety to the first silicon. For instance, the disiloxanes can be represented by Formula I with $R_5$ represented by Formula I-A and $R_9$ as a divalent organic moiety.

When the first substituent is a side chain that includes a poly(alkylene oxide) moiety, each of the entities linked to the second silicon can be alkyl groups and/or aryl groups. For instance, the second substituent can be an alkyl group or an aryl group. The disiloxanes can be represented by Formula I with $R_5$ represented by Formula I-A and $R_6$ as an alkyl group or an aryl group. Formula I-F provides an example of the disiloxane.

Formula I-F:

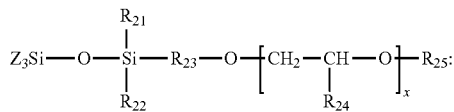

where $R_{21}$ is an alkyl group or an aryl group; $R_{22}$ is an alkyl group or an aryl group; $R_{23}$ is nil or a spacer; $R_{24}$ is a hydrogen atom or an alkyl group; $R_{25}$ is an alkyl group; Z is an alkyl or an aryl group and the Zs can be the same or different and x is from 1 to 30. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{23}$ has a structure according to: —$(CH_2)_3$—. In another example, the Zs, $R_{21}$, $R_{22}$ and $R_{25}$ are each a methyl group. In a preferred example, the Zs, $R_{21}$, $R_{22}$ and $R_{25}$ are each a methyl group, $R_{23}$ has a structure according to: —$(CH_2)_3$— and $R_{24}$ is a hydrogen. In a more preferred example, the Zs, $R_{21}$, $R_{22}$ and $R_{25}$ are each a methyl group, $R_{23}$ has a structure according to: —$(CH_2)_3$—; $R_{24}$ is a hydrogen; and x is 3. A preferred example of the disiloxane is provided in the following Formula I-G:

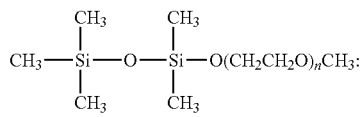

wherein n is 1 to 12. A particularly preferred disiloxane is represented by Formula I-G with n=3.

When the first substituent is a side chain that includes a poly(alkylene oxide) moiety, the second substituent can be a side chain that includes a poly(alkylene oxide) moiety. For instance, the disiloxane can be represented by Formula I with $R_5$ represented by Formula I-A and $R_6$ represented by Formula I-D. An example of the disiloxanes is provided in the following Formula I-H:

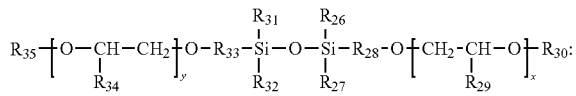

wherein $R_{26}$ is an alkyl group or an aryl group; $R_{27}$ is an alkyl group or an aryl group; $R_{28}$ is nil or a spacer; $R_{29}$ is a hydrogen atom or an alkyl group; $R_{30}$ is an alkyl group; $R_{31}$ is an alkyl group or an aryl group; $R_{32}$ is an alkyl group or an aryl group; $R_{33}$ is nil or a spacer; $R_{34}$ is a hydrogen atom or an alkyl group; $R_{35}$ is an alkyl group; x is from 1 to 30 and y is from 1 to 30. $R_{28}$ and $R_{33}$ can be the same or different. Each spacer can be an organic spacer and can include one or more —$CH_2$— groups. Other suitable spacers can include an alkylene, alkylene oxide or bivalent ether. These spacers can be substituted or unsubstituted. The above spacers can be completely or partially halogenated. For instance, the above spacers can be completely or partially fluorinated. In one example, $R_{28}$ and $R_{33}$ each has a structure according to: —$(CH_2)_3$—. In another example, $R_{26}$, $R_{27}$, $R_{31}$, and $R_{32}$ are each an alkyl group. In another example, $R_{26}$, $R_{27}$, $R_{30}$, $R_{31}$, $R_{32}$, and $R_{35}$ are each a methyl group. In another example, $R_{30}$ and $R_{35}$ have the same structure, $R_{29}$ and $R_{34}$ have the same structure, $R_{28}$ and $R_{33}$ have the same structure and $R_{26}$, $R_{27}$, $R_{31}$, and $R_{32}$ have the same structure. A preferred example of the disiloxane is presented in Formula I-J:

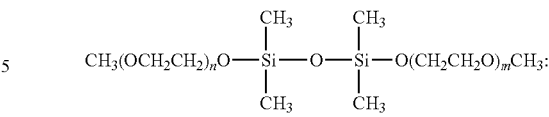

wherein n is 1 to 12 and m is 1 to 12. A particularly preferred disiloxane is represented by Formula I-J with n=3 and m=3.

When the first substituent is a side chain that includes a poly(alkylene oxide) moiety, the second substituent can be a side chain that includes a cyclic carbonate moiety. For instance, the disiloxane can be represented by Formula I with $R_5$ represented by Formula I-A and $R_6$ represented by Formula I-E.

In another example of the disiloxane, the first substituent cross links the disiloxane to a second siloxane and includes a poly(alkylene oxide) moiety. The poly(alkylene oxide) moiety can include an oxygen linked directly to the first silicon. For instance, the disiloxane can be represented by Formula I with $R_5$ represented by Formula I-C and $R_{14}$ as nil. In some instances, the poly(alkylene oxide) moiety also includes a second oxygen liked directly to the backbone of the second siloxane. For instance, the disiloxane can be represented by Formula I with $R_5$ represented by Formula I-C, $R_{14}$ as nil, and $R_{15}$ as nil. Alternately, a spacer can link the poly(alkylene oxide) moiety to the first silicon. For instance, the disiloxanes can be represented by Formula I with $R_5$ represented by Formula I-A and $R_{14}$ as a divalent organic moiety. In some instances, the poly(alkylene oxide) moiety also includes a second spacer linking the poly(alkylene oxide) moiety to the backbone of the second siloxane. For instance, the disiloxane can be represented by Formula I with $R_5$ represented by Formula I-C, $R_{14}$ as a divalent organic moiety, and $R_{15}$ as a divalent organic moiety.

When the first substituent cross links the disiloxane to a second siloxane and includes a poly(alkylene oxide) moiety, each of the entities linked to the second silicon can be an aryl group or an alkyl group. For instance, the second substituent can be an alkyl group or an aryl group. The disiloxanes can be represented by Formula I with $R_5$ represented by Formula I-C and $R_6$ as an alkyl group or an aryl group. Formula I-K provides an example of the disiloxane where the poly(alkylene oxide) moiety includes an oxygen linked directly to the first silicon.

Formula I-K:

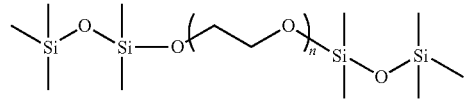

wherein n is 1 to 12. Formula I-L provides an example of the disiloxane where an organic spacer is positioned between the poly(alkylene oxide) moiety and the first silicon.

Formula I-L:

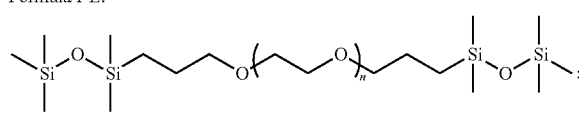

wherein n is 1 to 12.

When the first substituent cross links the disiloxane to a second siloxane and includes a poly(alkylene oxide) moiety, the second substituent can be a side chain that includes a poly(alkylene oxide) moiety. For instance, the disiloxanes can be represented by Formula I with $R_5$ represented by Formula I-C and $R_6$ represented by Formula I-D.

When the first substituent cross links the disiloxane to a second siloxane and includes a poly(alkylene oxide) moiety, the second substituent can be a side chain that includes a cyclic carbonate moiety. For instance, the disiloxanes can be represented by Formula I with $R_5$ represented by Formula I-C and $R_6$ represented by Formula I-E.

In another example of the disiloxane, the first substituent is a side chain that includes a cyclic carbonate moiety. For instance, the disiloxane can be represented by Formula I with $R_5$ represented by Formula I-B.

When the first substituent is a side chain that includes a cyclic carbonate moiety, each of the entities linked to the second silicon can be an aryl group or an alkyl group. For instance, the second substituent can be an alkyl group or an aryl group. The disiloxane can be represented by Formula I with $R_5$ represented by Formula I-B and with $R_6$ as an alkyl group or an aryl group. A preferred example of the disiloxane is presented by the following Formula I-M:

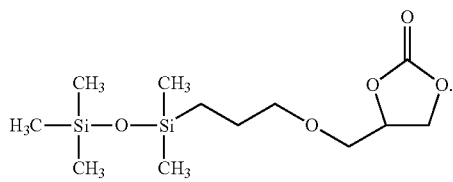

When the first substituent is a side chain that includes a cyclic carbonate moiety, the second substituent can be a side chain that includes a cyclic carbonate moiety. For instance, the disiloxane can be represented by Formula I with $R_5$ represented by Formula I-B and $R_6$ represented by Formula I-E. The structure of the first substituent can be the same as the structure of the second substituent or can be different from the structure of the second substituent. A preferred example of the disiloxane is presented by the following Formula I-N:

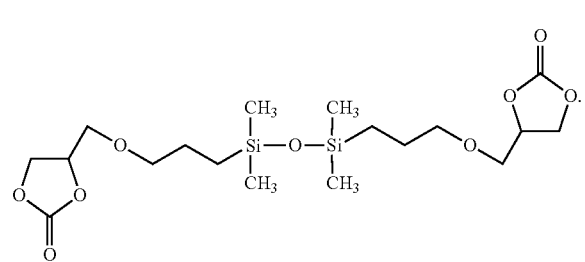

The electrolyte can include a single disiloxane and none or more other siloxanes. Alternately, the electrolyte can include two or more disiloxanes and none or more other siloxanes. Examples of other suitable siloxanes include, but are not limited to, trisiloxanes, tetrasiloxanes, pentasiloxanes, oligosiloxanes or polysiloxanes. Examples of suitable disiloxanes, trisiloxanes and tetrasiloxanes are disclosed in U.S. Provisional Patent application Ser. No. 60/543,951, filed on Feb. 11, 2004, entitled "Siloxanes;" and in U.S. Provisional Patent application Ser. No. 60/543,898, filed on Feb. 11, 2004, entitled "Siloxane Based Electrolytes for Use in Electrochemical Devices;" and in U.S. Provisional Patent application Ser. No. 60/542,017, filed on Feb. 4, 2004, entitled "Nonaqueous Electrolyte Solvents for Electrochemical Devices;" each of which is incorporated herein in its entirety. Suitable trisiloxanes are disclosed in U.S. patent application Ser. No. 10/971,913, filed Oct. 21, 2004, entitled "Electrochemical Device Having Electrolyte Including Trisiloxane" and incorporated herein in its entirety. Suitable tetrasiloxanes are disclosed in U.S. patent application Ser. No. 10/971,926, filed Oct. 21, 2004, entitled "Electrochemical Device Having Electrolyte Including Tetrasiloxane" and incorporated herein in its entirety. In some instances, at least one of the two or more disiloxanes is chosen from those represented by Formula I through Formula I-N. Alternately, each of the disiloxanes can be chosen from those represented by Formula I through Formula I-N.

The electrolyte can also optionally include one or more silanes. Suitable silanes for use in an electrolyte can be substituted. In some instances, the silane includes four organic substituents. The silane can include at least one substituent that includes a moiety selected from a first group consisting of an alkyl group, a halogenated alkyl group, an aryl group, a halogenated aryl group, an alkoxy group, a halogenated alkoxy group, an alkylene oxide group or a poly(alkylene oxide) and at least one substituent that includes a moiety selected from a second group consisting of an alkoxy group, a carbonate group, an alkylene oxide group and a poly(alkylene oxide) group. In some instances, the silane includes four substituents that each includes a moiety selected from the first group or from the second group. The moieties in the first group and in the second group can be substituted or unsubstituted. In some instance, the silane includes one or more substituents that include a halogenated moiety selected from the first group and the second group. Examples of suitable silanes include, but are not limited to, phenyltrimethoxysilane, pentafluorophenyltrimethoxysilane, phenethytris(trimethylsiloxy)silane.

The silanes can be represented by the following Formula III-A through Formula III-C:

Formula III-A:

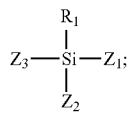

Formula III-B:

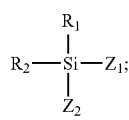

Formula III-C:

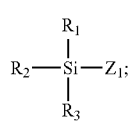

wherein, $R_1$ is an alkyl, a halogenated alkyl, aryl, halogenated aryl, an alkoxy, a halogenated alkoxy or is represented by Formula III-D; $R_2$ is an alkyl, a halogenated alkyl, aryl, halogenated aryl, an alkoxy, a halogenated alkoxy or is represented by Formula III-D; $R_3$ is an alkyl, a halogenated alkyl, aryl, halogenated aryl, an alkoxy, a halogenated alkoxy or is represented by Formula III-D; $Z_1$ is an alkoxy, a halogenated alkoxy, or is represented by Formula III-E or is represented by Formula III-F; $Z_2$ is an alkoxy, a halogenated alkoxy, or is represented by Formula III-E or is represented by Formula III-F; $Z_3$ is an alkoxy, a halogenated alkoxy, or is represented by Formula III-E or is represented by Formula III-F. In instances where more than one of $R_1$, $R_2$ and $R_3$ is represented by Formula III-D, the $R_1$, $R_2$ and $R_3$ represented by Formula III-D can be the same or different. In instances where more than one of $Z_1$, $Z_2$ and $Z_3$ is represented by Formula III-E, the $Z_1$, $Z_2$ and $Z_3$ represented by Formula III-E can be the same or different. In instances where more than one of $Z_1$, $Z_2$ and $Z_3$ is represented by Formula III-F, the $Z_1$, $Z_2$ and $Z_3$ represented by Formula III-F can be the same or different.

Formula III-D:

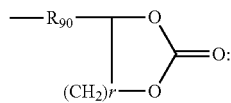

wherein $R_{90}$ is an organic spacer and r is 1 to 2. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{90}$ is a bivalent ether moiety represented by: —$CH_2$—O—$(CH_2)_3$— with the —$(CH_2)_3$— linked to a silicon on the backbone of the disiloxane. In another example, $R_{90}$ is a alkylene oxide moiety represented by: —$CH_2$—O— with the oxygen linked to a silicon on the backbone of the disiloxane.

Formula III-E:

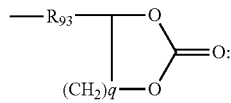

wherein $R_{93}$ is an organic spacer and q is 1 to 2. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{93}$ is a bivalent ether moiety represented by: —$CH_2$—O—$(CH_2)_3$— with the —$(CH_2)_3$— linked to a silicon on the backbone of the disiloxane. In another example, $R_{93}$ is a alkylene oxide moiety represented by: —$CH_2$—O— with the oxygen linked to a silicon on the backbone of the disiloxane.

Formula III-F:

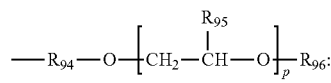

wherein $R_{94}$ is nil or an organic spacer; $R_{95}$ is hydrogen; alkyl or aryl; $R_{96}$ is alkyl or aryl; p is 1 to 12. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{94}$ is represented by: —$(CH_2)_3$—. One or more of the alkyl and aryl groups specified in Formula III through Formula III-F can be substituted, unsubstituted, halogenated, and/or fluorinated.

Other suitable silanes are disclosed in U.S. Provisional Patent Application Ser. No. 60/601,452, filed on Aug. 13, 2004, entitled "Electrolyte Including Silane for Use in Electrochemical Devices," and incorporated herein in its entirety; and in U.S. patent application Ser. No. 10/810,080, filed on Mar. 25, 2004, entitled "Electrolyte Use in Electrochemical Devices," and incorporated herein in its entirety.

An example of a preferred solvent for use with the electrolyte includes or consists of one or more first siloxanes and/or one or more first silanes and one or more second siloxanes and/or one or more second silanes. Each of the first siloxanes and/or first silanes have one or more first substituents that each include a poly(alkylene oxide) moiety. Each of the second siloxanes and/or second silanes have one or more second substituents that each include a cyclic carbonate moiety. In one example, the solvent includes a first disiloxane having a substituent with a poly(alkylene oxide) moiety and a second disiloxane having a substituent with the cyclic carbonate moiety.

In some instances, the solvent includes one or more organic solvents in addition to one or more of the silanes and/or in addition to one or more of the siloxanes. Organic solvents can reduce the viscosity of the siloxanes and/or the silanes. Additionally or alternately, the addition of organic solvents can increase the ionic conductivity of the electrolyte. Preferred organic solvents include cyclic carbonates such as propylene carbonate (PC), ethylene carbonate (EC), butylene carbonate (BC) and vinylene carbonate (VC). Examples of suitable organic solvents include, but are not limited to, linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters. In some instances, the solvent excludes organic solvents. When the solvent includes one or more organic solvents, a suitable volume ratio of the total organic solvents to the total siloxane and silane is greater than 1:99, 1:9, or 3:7 and/or less than 9:1, 4:1 or 7:3.

In some instances, the solvent includes one or more additives. Additives can enhance the ionic conductivity and/or enhance the voltage stability of the electrolyte. A preferred additive forms a passivation layer on one or more electrodes in an electrochemical device such as a battery or a capacitor. The passivation layer can enhance the cycling capabilities of the electrochemical device. In one example, the passivation layer is formed by reduction of the additive at the surface of an electrode that includes carbon. In another example, the additive forms a polymer on the surface of an electrode that includes carbon. The polymer layer can serve as the passivation layer.

Vinyl ethylene carbonate (VEC) and vinyl carbonate (VC) are examples of additives that can form a passivation layer by being reduced and polymerizing to form a passivation layer. When they see an electron at the surface of a carbonaceous anode, they are reduced to $Li_2CO_3$ and butadiene that polymerizes at the surface of the anode. Ethylene sulfite (ES) and propylene sulfite (PS) form passivation layers by mechanisms that are similar to VC and VEC. In some instances, one or more of the additives has a reduction potential that exceeds the reduction potential of the components of the solvent. For instance, VEC and VC have a reduction potential of about 2.3V. This arrangement of reduction potentials can encourage the additive to form the passivation layer before reduction of other solvent components and can accordingly reduce consumption of other electrolyte components.

Suitable additives include, but are not limited to, carbonates having one or more unsaturated substituents. For instance, suitable additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, $C_7H_4O_3$); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (ClEC). Other suitable additives include, acetates having one or more unsaturated substituents such as vinyl acetate (VA). Other suitable additives include cyclic alkyl sulfites and linear sulfites. For instance, suitable additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable additives include halogenated-gamma-butyrolactones such as bromo-gamma-butyrolactone (BrGBL) and fluoro-gamma-butyrolactone (FGBL).

The additives can include or consist of one or more additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), o-phenylene carbonate (CC), trifluoropropylene carbonate (TFPC), 2-propenyl ethyl carbonate, fluoroethylene carbonate (FEC), chloroethylene carbonate (ClEC), vinyl acetate (VA), propylene sulfite (PS), 1,3dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more additives selected from the group consisting of vinyl carbonate (VC), vinyl ethylene carbonate (VEC), ethylene sulfite (ES), propylene sulfite (PS), and phenyl ethylene carbonate (PhEC). In a preferred example, the electrolyte includes or consists of one or more additives selected from the group consisting of vinyl carbonate (VC), vinyl ethylene carbonate (VEC), ethylene sulfite (ES), and propylene sulfite (PS). In another preferred example, the electrolyte includes vinyl carbonate (VC) and/or vinyl ethylene carbonate (VEC).

In some conditions, certain organoborate salts, such as LiDfOB, can form a passivation layer. As a result, the desirability and/or concentration of additives may be reduced when organoborate are employed as salts. In some instances, the concentration of additives in the electrolyte generally does not greatly exceed the concentration needed to form the passivation layer. As a result, the additives are generally present in smaller concentrations than salts. A suitable concentration for an additive in the solvent includes, but is not limited to, concentrations greater than 0.1 wt %, greater than 0.5 wt % and/or less than 5 wt %, less than 20 wt %, or less than 35 wt % where each of the wt % refers to the percentage of the total weight of the solvent. In a preferred embodiment, the concentration of the additive is less than 3 wt % or less than 2 wt %.

An electrolyte can be generated by dissolving one or more salts in one or more disiloxanes. In instances where the solvent includes components in addition to the one or more disiloxanes, such as additives, organic solvents, silanes and/or other siloxanes, one or more of the salts can be dissolved in another component(s) before the other component(s) are combined with the one or more disiloxanes. The electrolyte can be prepared such that the concentration of the salt in the solvent is about 0.3 to 2.0 M, about 0.5 to 1.5 M, or about 0.7 to 1.2 M. Suitable salts for use with the electrolyte include, but are not limited to, alkali metal salts including lithium salts. Examples of lithium salts include $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, organoborate salts and mixtures thereof. A preferred salt for use with the electrolyte includes organoborate salts such as lithium bis(oxalato)borate (LiBOB) and lithium difluoro oxalato borate (LiDfOB). Examples of suitable organoborate salts are disclosed in U.S. Patent Application Ser. No. 60/565,211 filed on Apr. 22, 2004, entitled "Organoborate Salt in Electrochemical Device Electrolytes" and incorporated herein in its entirety.

Suitable salts for use with the electrolyte include, but are not limited to, alkali metal salts including lithium salts. Examples of lithium salts include $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, organoborate salts and mixtures thereof. A preferred salt for use with the electrolyte include organoborate salts such as lithium bis(chelato)borates including lithium bis(oxalato)borate (LiBOB) and lithium difluoro oxalato borate (LiDfOB). Examples of suitable organoborate salts are disclosed in U.S. Patent Application Ser. No. 60/565,211, filed on Apr. 22, 2004, entitled "Organoborate Salt in Electrochemical Device Electrolytes" and incorporated herein in its entirety.

When a lithium salt is used with the electrolyte, an [EO]/[Li] ratio can be used to characterize the salt in the electrolyte. [EO] is the molar concentration in the electrolyte of the ethylene oxides in the one or more disiloxanes. In some instances, spacers and/or silanes will also include ethylene oxides that contribute to the [EO]. The electrolyte is preferably prepared so as to have a [EO]/[Li] ratio of 5 to 50. When the [EO]/[Li] ratio is larger than 50, the ionic conductivity of the resulting electrolyte can become undesirably low because few carrier ions are in the electrolyte. When the [EO]/[Li] ratio is smaller than 5, the lithium salt may not sufficiently dissociate in the resulting electrolyte and the aggregation of lithium ions can confine the ionic conductivity.

In some instances, an organoborate salt is used as an additive and one or more non-organoborate salts are used as a salt. For instance, an organoborate salt can be present in a concentration that does not greatly exceed the concentration needed to form the passivation layer while the one or more non-organoborate salts are present at the higher salt concentrations. This arrangement permits the electrolyte to have the advantages of the passivation layer formation provided by organoborate salts while retaining advantages offered by non-organoborate salts. Suitable concentration for an organoborate additive in the solvent before discharge of the battery in the electrolyte includes, but is not limited to, concentrations greater than 0.005, greater than 0.001 M and/or less than 0.05 M, less than 0.2 M or less than 1.0 M. In a preferred embodiment, before discharge of the battery at least one organoborate additive is present in the solvent at a concentration of less than 0.1 M. Before discharge of the battery or before formation of the passivation layer, a suitable molar ratio of the total concentration of the non-organoborate salts in the solvent: total organoborate additive concentration in the solvent includes ratios greater than 4:1, 10:1, 40:1, or 200:1 and/or less than 50:1, 100:1, 400:1 or 800:1. In some instances, the molar ratio is in a range of 50:1 to 200:1.

A preferred embodiment of the electrolyte includes or consists of: one or more disiloxanes and an organoborate salt. Another preferred embodiment of the electrolyte includes or consists of: one or more disiloxanes and lithium(oxalato) borate (LiBOB). Another preferred embodiment of the electrolyte includes or consists of: one or more disiloxanes and lithium difluoro oxalato borate (LiDfOB) salt. Another preferred embodiment of the electrolyte includes or consists of: one or more disiloxanes, one or more silanes and an organoborate salt. Another preferred embodiment of the electrolyte includes or consists of: one or more disiloxanes and one or silanes, and lithium difluoro oxalato borate (LiDfOB) salt. Another preferred embodiment of the electrolyte includes or consists of: one or more disiloxanes, one or more silanes, and lithium difluoro oxalato borate (LiDfOB) salt.

A preferred embodiment of the electrolyte includes or consists of: one or more disiloxanes, $LiPF_6$, and one or more additives selected from a group consisting of VC and VEC. Another preferred embodiment of the electrolyte includes or consists of: one or more disiloxanes, one or more silanes, $LiPF_6$, and one or more additives selected from a group consisting of VC and VEC.

The electrolyte can include a network polymer that forms an interpenetrating network with a component in the solvent. For instance, the electrolyte can include a network polymer that forms an interpenetrating network with a disiloxane in the solvent. An electrolyte having an interpenetrating network can be generated by polymerizing and/or cross-linking one or more network polymers in the presence of the disiloxane. Alternately, an electrolyte having an interpenetrating network can be generated by polymerizing and/or cross-linking one or more network polymers and the disiloxane in the presence of one another.

Suitable network monomers from which the network polymer can be formed include, but are not limited to, acrylates and methacrylates. Acrylates and/or methacrylates having one or more functionalities can homopolymerize to form a polyacrylate and/or a polymethacrylate network polymer. Acrylates and/or methacrylates having two or more functionalities can both polymerize and cross-link to form a cross-linked polyacrylate network polymer and/or to form a cross-linked polymethacrylate network polymer. In some instances, acrylates and/or methacrylates having four or more functionalities are a preferred network monomer. Suitable acrylates include, but are not limited to, poly(alkylene glycol) dialkyl acrylate. Suitable methacrylates include, but are not limited to, poly(alkylene glycol) dialkyl methacrylate.

A suitable network monomer is represented by the following

Formula IV:

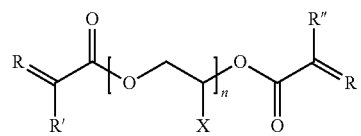

wherein: R is represented by $=CR'''R''''$ and each can be the same or different; R' represents hydrogen or a group selected from an alkyl group having 1 to 10 carbon atoms and/or an alkenyl group having 2 to 12 carbon atoms; R" represents hydrogen or a group selected from an alkyl group having 1 to 10 carbon atoms or an alkenyl group having 2 to 12 carbon atoms; R''' represents hydrogen or a group selected from an alkyl group having 1 to 10 carbon atoms; R'''' represents hydrogen or a group selected from an alkyl group having 1 to 10 carbon atoms; X is hydrogen or a methyl group; and n represents a numeral of 1 to 15.

When a monomer that cross-links is employed to form a cross-linked network polymer, a control monomer can be employed to control cross-linking density. A suitable control monomer for use with a network monomer according to Formula IV is represented by the following Formula V:

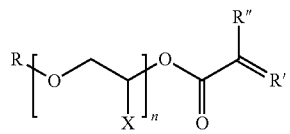

wherein: R is represented by $=CR'''R''''$; R' is an alkyl group having 1 to 10 carbon atoms; R" is hydrogen or a group selected from an alkyl group having 1 to 10 carbon atoms or an alkenyl group having 2 to 12 carbon atoms; R''' represents hydrogen or a group selected from an alkyl group having 1 to 10 carbon atoms; R'''' represents hydrogen or a group selected from an alkyl group having 1 to 10 carbon atoms; X is hydrogen or a methyl group; and n represents a whole number from 1 to 20. During formation of the network polymer, the illustrated control monomer serves as a co-monomer with the network monomers according to Formula IV. Because the control monomer does not cross link, increasing the amount of control monomer present during formation of the network polymer can reduce the density of cross-linking.

Diallyl terminated compounds can also be employed as a network monomer. Diallyl terminated compounds having two or more functionalities can polymerize and cross-link to form the network polymer. An example of a diallyl-terminated compound having two functionalities that allow the compound to polymerize and cross-link is represented by Formula VI.

Formula VI:

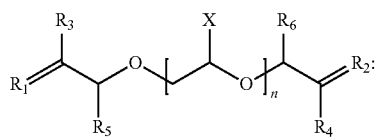

wherein $R_1$ is represented by $=CR'''R''''$, $R_2$ is represented by $=CR'''R''''$; $R_3$ represents hydrogen or a group selected from an alkyl group having 1 to 10 carbon atoms or an alkenyl group having 2 to 12 carbon atoms; $R_4$ represents hydrogen or a group selected from an alkyl group having 1 to 10 carbon atoms or an alkenyl group having 2 to 12 carbon atoms; $R_5$ represents hydrogen or a group selected from an alkyl group having 1 to 10 carbon atoms or an alkenyl group having 2 to 12 carbon atoms; $R_6$ represents hydrogen or a group selected from an alkyl group having 1 to 10 carbon atoms or an alkenyl group having 2 to 12 carbon atoms; $R'''$ represents hydrogen or a group selected from an alkyl group having 1 to 10 carbon atoms; $R''''$ represents hydrogen or a group selected from an alkyl group having 1 to 10 carbon atoms; X is hydrogen or a methyl group; and n represents a numeral of 1 to 15.

Formula VII represents an example of a control monomer for controlling the cross linking density of a compound represented by Formula VI.

Formula VII:

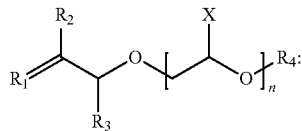

wherein $R_1$ is represented by $=CR'''R''''$, $R_2$ represents hydrogen or a group selected from an alkyl group having 1 to 10 carbon atoms or an alkenyl group having 2 to 12 carbon atoms; $R_3$ represents hydrogen or a group selected from an alkyl group having 1 to 10 carbon atoms or an alkenyl group having 2 to 12 carbon atoms; $R_4$ represents hydrogen or a group selected from an alkyl group having 1 to 10 carbon atoms or an alkenyl group having 2 to 12 carbon atoms; $R'''$ represents hydrogen or a group selected from an alkyl group having 1 to 10 carbon atoms; $R''''$ represents hydrogen or a group selected from an alkyl group having 1 to 10 carbon atoms; X is hydrogen or a methyl group; and n represents a numeral of 1 to 15.

A diallyl-terminated compound suitable for serving as a network monomer can include more than two functionalities. For instance, the oxygens shown in Formula IV can be replaced with $CH_2$ groups to provide a diallyl-terminated compound having four functionalities that allow the compound to polymerize and cross-link. Further, the carbonyl groups shown in Formula IV can be replaced with allyl groups to provide an example of a control monomer for controlling the cross linking density of the terminated-terminated compound. Other suitable diallyl-terminated compounds for serving as a network monomer include, but are not limited to, poly(alkylene glycol) diallyl ether. A specific examples includes, but is not limited to, tetra(ethylene glycol) diallyl ether.

An electrolyte that includes an interpenetrating network can be formed by generating a precursor solution that includes the one or more disiloxanes, the monomers for forming the cross-linked network polymer and one or more of the salts. The precursor solution can also optionally be generated so as to include one or more radical initiators. The precursor solution can also be optionally also generated so as to include one or more other electrolyte components. Suitable radical initiators include, but are not limited to, thermal initiators including azo compounds such as azoisobutyronitrile, peroxide compounds such as benzoylperoxide, and bismaleimide.

A control monomer can also optionally be added to the precursor solution to control the cross-linking density of the network monomer. The monomers are cross-linked and/or polymerized to form the electrolyte. In some instance, the temperature of the precursor solution is elevated and/or the precursor solution is exposed to UV to form the electrolyte. The resulting electrolyte can be a liquid, solid or gel. The physical state of the electrolyte can depend on the ratio of the components in the precursor solution.

In an electrolyte formed using the monomers represented by Formula IV, the network polymer is formed from a monomer that homopolymerizes and cross-links. Alternately, an electrolyte having an interpenetrating network can be generated from a polymer and a cross-linking agent for cross-linking of the polymer. For instance, a diallyl terminated compound can serve as a cross linking agent for a polysiloxane having a backbone that includes one or more silicons linked to a hydrogen. Examples of suitable diallyl terminated cross-linking agents include, but are not limited to, diallyl-terminated siloxanes, diallyl terminated polysiloxanes, diallyl terminated alkylene glycols and diallyl terminated poly (alkylene glycol)s.

The electrolyte can be generated by preparing a precursor solution that includes the polymer, the cross linking agent, the one or more disiloxanes and one or more salts. The precursor solution can also optionally be generated so as to include one or more catalysts. The precursor solution can also be optionally also generated so as to include one or more other electrolyte components. Suitable catalysts include, but are not limited to, platinum catalysts such as Karlstedt's catalyst and $H_2PtCl_6$. In some instances, an inhibitor is added to the precursor solution to slow the cross-linking reaction enough to permit handling prior to viscosity changing. Suitable inhibitors include, but are not limited to, dibutyl maleate. The polymer is cross-linked to form the electrolyte. In some instances, heat and/or UV energy is also applied to the precursor solution during the reaction of the cross linking precursor and the cross-linking agent.

A network polymer suitable for the interpenetrating network can be formed using other precursors. For instance, the network polymer can be generated from a mixture of monomers and cross-linking agents that are different from one another. The monomers can polymerize and the cross-linking agents can provide cross-linking of the resulting polymer. In another example, monomers that heteropolymerize are employed to generate the network polymer. Other examples of methods for generating electrolytes and electrochemical devices that include network polymers are described in U.S. patent application Ser. No. 10/104,352, filed on Mar. 22, 2002, entitled "Solid Polymer Electrolyte and Method of Preparation" and incorporated herein by reference in its entirety.

As noted above, the electrolyte can include one or more solid polymers in addition to the solvent. The solid polymers are each a solid when standing alone at room temperature. As a result, the ratio of solid polymer to the other electrolyte components can be selected so as to provide an electrolyte that is a solid at room temperature. A suitable solid polymer is an aprotic polar polymer or aprotic rubbery polymer. Examples of suitable solid polymers include, but are not limited to, polyacrylonitrile (PAN), poly(methyl methacrylate) (PMMA), poly(vinylidene fluoride) (PVDF), poly(vinylidene fluoride-co-hexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO) and mixtures thereof.

The electrolyte can be generated by preparing a precursor solution that includes one or more disiloxanes and a solution that includes a solid polymer. The solution that includes the solid polymer can be generated by dissolving the solid polymer in a solvent such as N-methylpyrrolidone (NMP), dimethyl formamide, dimethyl acetamide, tetrahydrofuran, acetonitrile, and/or water. The precursor solution can optionally be prepared so as to include additional electrolyte components, such as one or more additives and/or one or more organic solvents and/or one or more other siloxanes and/or one or more silanes. One or more salts can be added to the precursor solution or the salt can be dissolved in a component of the precursor solution before adding the component to the precursor solution. A solid electrolyte can be formed by evaporating the solvent from the precursor solution.

An electrolyte that includes one or more solid polymers can also be generated by polymerizing a solid polymer in the presence of the disiloxane. For instance, a precursor solution can be generated so as to include one or more disiloxanes, monomers for the solid polymer and a radical initiator. Suitable radical initiators include, but are not limited to, thermal initiators including azo compounds such as azoisobutyronitrile, peroxide compounds such as benzoylperoxide, and bismaleimide. The precursor solution can optionally be prepared so as to include additional electrolyte components, such as one or more additives and/or one or more organic solvents and/or one or more other siloxanes and/or one or more silanes. One or more salts can be added to the precursor solution or the salt can be dissolved in a component of the precursor solution before adding the component to the precursor solution. The electrolyte can be formed by polymerizing the monomers. As an example, acrylonitrile monomers can be mixed with the disiloxane. The acrylonitrile monomers can be polymerized by the application of heat and/or UV to form an electrolyte having a polyacrylonitrile solid polymer.

As evident from the above discussion, the electrolyte can include a variety of components such as silane(s), siloxanes, secondary silanes, additives, network polymers and/or solids polymers. One or more components of the electrolyte can be exposed to a zeolite to further purify the component. For instance, the silane(s) and/or siloxane(s) can be exposed to a zeolite to further purify the silane(s) and/or siloxane(s). It is believed that a zeolite can reduce impurities such as water, a variety of organic impurities and oxalate derivatives. The organic impurities are believed to include more hydrocarbon(s), one or more alcohol(s), and organic acid(s) such as oxalic acid. The organic impurities and water may be residual materials from the synthesis and processing of the silane(s) and/or siloxanes. When more than one electrolyte component is exposed to the zeolite, all or a portion of the components that are to be exposed can be mixed and then exposed to the zeolite, or the components can be independently exposed to a zeolite before mixing of the components, or different combinations of components can be independently exposed to a zeolite before mixing of the components. In one example, the electrolyte is generated and then the electrolyte is exposed to the zeolite. In most instances, the zeolite and component(s) are separated after exposure of the component(s) to the zeolite. The use of zeolites in conjunction with silanes is disclosed in U.S. patent application Ser. No. 11/053,338, filed on Feb. 8, 2005, entitled "Reduction of Impurities in Battery Electrolyte, and incorporated herein in its entirety."

As is evident from the above discussion, the solvent can include components in addition to the one or more disiloxanes. For instance, the solvent can include other siloxanes, organic solvents, additives, and/or silanes. In some instances, the electrolyte is generated such that the one or more disiloxanes are more than 0.1 wt % of the solvent, more than 5 wt % of the solvent, more than 20 wt % of the solvent, more than 50 wt % of the solvent, more than 80 wt % of the solvent or more than 95 wt % of the solvent. In some instances, the electrolyte consists of one or more disiloxanes and one or more salts. In some instances, the electrolyte consists of one or more disiloxanes, one or more silanes and one or more salts. In some instances, the electrolyte consists of one or more disiloxanes, one or more additives and one or more salts.

The disiloxanes can be generated by employing a hydrosilylation reaction with a precursor disiloxane and side chain precursors. The precursor disiloxane has one or more hydrogens linked to the silicon(s) where the side chains are desired. The side chain precursor is allyl terminated. The side chain precursors also include a poly(alkylene oxide) moiety or a carbonate moiety. For the purposes of illustration, FIG. 1 illustrates a hydrosilylation reaction employed to generate a disiloxane having one or more side chains that include a poly(ethylene oxide) moiety and/or one or more side chains that includes a carbonate moiety. A precursor disiloxane having a silicon linked to a hydrogen is labeled A. The hydrogen is linked to the silicon in the backbone where the side chain is desired. An allyl terminated side chain precursor that includes a poly(ethylene oxide) moiety is labeled B and an allyl terminated side chain precursor that includes a cyclic carbonate moiety is labeled C. Although the precursor disiloxane is illustrated as having a single silicon linked to a hydrogen, when two side chains are to be added to a precursor disiloxane, the precursor disiloxane can include two or more hydrogens linked to a silicon in the backbone of the precursor disiloxane or can include one or more hydrogens linked to each of the silicons in the backbone. As is evident from FIG. 1, the hydrosilylation reaction is suitable for generating a disiloxane having a side chain with a spacer between a silicon and a poly(alkylene oxide) moiety or a between a silicon and a carbonate moiety.

When the desired disiloxane has one or more side chains that include a poly(ethylene oxide) moiety, a precursor solution is generated that includes the precursor disiloxane and the side chain precursor labeled B. When the desired disiloxane has one or more side chains that include a carbonate moiety, a precursor solution is generated that includes the precursor disiloxane and the side chain precursor labeled C. When the desired disiloxane has one or more side chains that include a poly(ethylene oxide) moiety and one or more side chains that include a carbonate moiety, a precursor solution is generated that includes the side chain precursor labeled B, the side chain precursor labeled C, and a precursor disiloxanes with at least two hydrogens linked to the same silicon or linked to different silicons.

In some instances, a reaction solvent is added to the precursor solution of FIG. 1. A suitable solvent includes, but is not limited to, toluene, THF, and benzene. A catalyst can be added to the precursor solution to catalyze the hydrosilylation reaction. Suitable catalysts for use in the precursor solution include, but are not limited to, platinum catalysts such as Karstedt's catalyst (divinyltetramethyldisiloxane (Pt(dvs)), dicyclopentadiene platinum(II) dichloride, $H_2PtCl_6$. In some instances, heat is applied to the precursor solution to react the components of the precursor solution. The reaction can be continued until the Si—H groups are no longer evident on an FTIR spectrum. The product solution can be distilled to remove any unreacted side-chain precursors and/or reaction solvent. In some instances, the product is decolorized and/or purified by distillation. The product can be decolorized by activated charcoal in refluxing toluene. The product can be purified by distillation using a long vacuum jacketed Vigreux column and/or by sequentially performing two or more regular distillations. The regular distillations can be vacuum distillations. When a sequence of two or more regular distillations is performed, a central fraction of the distillate can be used as the product for each distillation step.

Figure 2:
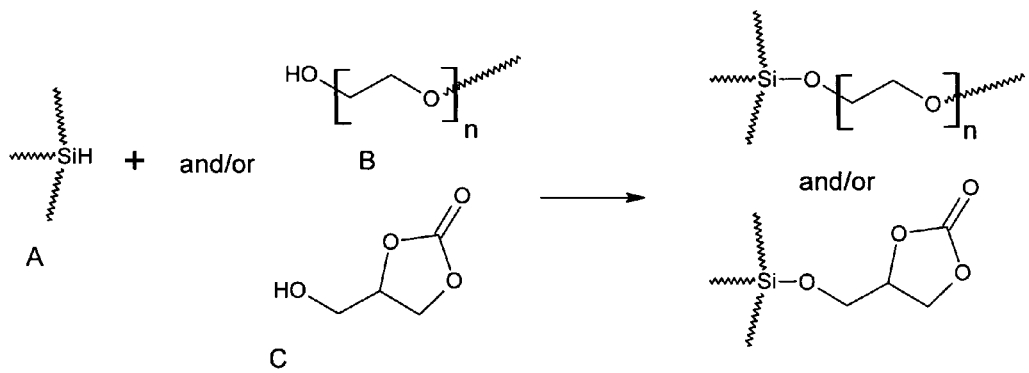
FIG. 2 illustrates a dehydrogenation reaction suitable for generating the disiloxanes.

The disiloxanes can also be generated using a dehydrogenation reaction between a precursor disiloxane and side-chain precursors. The precursor disiloxane has one or more hydrogens linked to the silicon(s) where the side chain(s) are desired. A suitable side chain precursor includes a poly(alkylene oxide) moiety and a terminal —OH group or a cyclic carbonate moiety and a terminal —OH group. For the purposes of illustration, FIG. 2 illustrates an example of a method for employing dehydrogenation to generate a disiloxane having a side chain(s) that include a poly(alkylene oxide) moiety and/or a side chain(s) that include a carbonate moiety. A precursor disiloxane having at least one silicon linked to a hydrogen is labeled A. The hydrogen is linked to a silicon where a side chain is desired. An —OH terminated side chain precursor that includes a poly(ethylene oxide) moiety is labeled B and an —OH terminated side chain precursor that includes a cyclic carbonate moiety is labeled C. A precursor solution is generated that includes the precursor disiloxane and the side chain precursor labeled B and/or the side chain precursor labeled C. Although the precursor disiloxane is illustrated as having a single silicon linked to a hydrogen, when two side chains are to be added to a precursor disiloxane, the precursor disiloxane can include two or more hydrogens linked to a silicon in the backbone of the precursor disiloxanes or can include one or more hydrogens linked to each of the silicons in the backbone. As is evident from FIG. 2, the dehydrogenation reaction is suitable for generating a disiloxane having a silicon that is directly linked to an oxygen included in a poly(alkylene oxide) moiety.

In some instances, a reaction solvent is added to the precursor solution of FIG. 2. A suitable solvent includes, but is not limited to, Toluene. In some instances, a catalyst is added to the precursor solution to catalyze the dehydrogenation reaction. Suitable catalysts for use in the precursor solution include, but are not limited to, $B(C_6F_5)_3$, $K_2CO_3$, $N(C_2H_5)_3$, Rhodium catalyst ($Rh(Ph_3P)_3Cl$) and/or Palladium catalyst ($Pd_2(dba)_3$). In some instances, heat is applied to the precursor solution to react the components of the precursor solution. The reaction can be continued until the Si—H groups are no longer evident on an NMR spectrum. The product solution can be distilled to remove any unreacted side-chain precursors and/or reaction solvent. In some instances, the product is decolorized and/or purified by distillation. The product can be decolorized by activated charcoal in refluxing toluene. The product can be purified by distillation using a long vacuum jacketed Vigreux column and/or by sequentially performing two or more regular distillations. The regular distillations can be vacuum distillations. When a sequence of two or more regular distillations is performed, a central fraction of the distillate can be used as the product for each distillation step.

Figure 3:
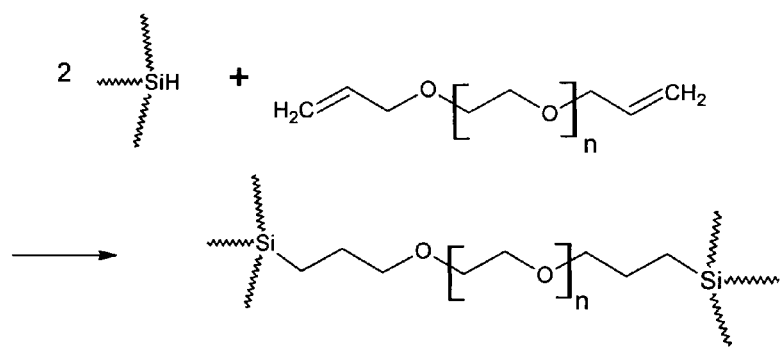
FIG. 3 illustrates a hydrosilylation reaction suitable for generating a disiloxane having a cross link to another siloxane.

The hydrosilylation reaction and/or the dehydrogenation reactions disclosed in the context of FIG. 1 and FIG. 2 can be adapted to generate disiloxanes that include a cross link to another siloxane. For instance, the dehydrogenation reaction can be employed by substituting a cross-link precursor having two or more terminus that each include an —OH group for the side chain precursor of FIG. 2. Alternately, the hydrosilylation reaction can be employed by substituting a diallyl-terminated cross-link precursor for the side chain precursor. As an example, FIG. 3 illustrates a diallyl-terminated cross-link precursor substituted for the side chain precursor of FIG. 1.

Each terminus of the cross-link precursor links to a silicon in the backbone of a different precursor disiloxane. When the desired disiloxane is to have one or more of the side chains and a cross link to another siloxane, a disiloxane precursor having a backbone linked to hydrogens at the desired locations of the cross link and side chain(s) can be employed. A precursor solution can be generated that includes the desired side chain precursor(s) and the cross-link precursor. For instance, a disiloxane having a side chain with a poly(alkylene oxide) moiety and a cross link can be generated from a precursor disiloxane having a backbone with a first silicon linked to a hydrogen and a second silicon linked to a hydrogen. The precursor disiloxane can be employed in a precursor solution that includes the precursor disiloxane, a cross link precursor according to FIG. 3 and a side chain precursor labeled B in FIG. 1.

The hydrosilylation reaction and/or the dehydrogenation reactions disclosed in the context of FIG. 1, FIG. 2 can be adapted to generate the silanes disclosed above by substituting a precursor silane for the precursor disiloxanes labeled A in FIG. 1 and FIG. 2. Suitable precursor silanes have one or more hydrogens linked to the silicon.

EXAMPLE 1

A dehydrogenation reaction was employed to generate a disiloxane according to Formula I-D with m=3 and n=3. Tri(ethylene glycol) methyl ether (9.68 g), 1,1,3,3,5,5-hexamethyltrisiloxane (10.4 g, Gelest, Inc.) and 40 ml of toluene were added to a flame-dried Schlenk flask under nitrogen atmosphere. To this solution was added 0.025 g (0.05 mol % of Si—H) tri(pentafluorophenyl) borane ($B(C_6F_5)_3$) in toluene. The reaction mixture was heated to and vigorously stirred at 80° C. Bubbling was observed. Aliquots were taken periodically and the dehydrogenative coupling reaction was monitored by FTIR measurements. After the reaction was complete, excess tri(ethylene glycol) methyl ether and the solvent were removed by Kugelrohr distillation. The structure of the product was confirmed by a lack of —OH absorption at ~3400 $cm^{-1}$ on an FTIR spectrum.

EXAMPLE 2

A hydrosilylation reaction was employed to generate a disiloxane according to Formula I-G where n is 3. Tri(ethylene glycol) allyl methyl ether (34.1 g, 20% excess) and 20.0 g pentamethyldisiloxane were added to an oven-dried, three-necked 100 mL flask by syringe. Karstedt's catalyst (104t, 3% wt. solution in xylene) was added and the reaction solution was heated to 75° C. for 24 hours and cooled down to room temperature. Samples were taken and the process of hydrosilylation was followed by $^1$H-NMR measurements. After completion of the reaction, the excess tri(ethylene glycol) allyl methyl ether and its isomers were removed by Kugelrohr distillation. The product was decolorized by activated charcoal in refluxing toluene and purified by vacuum distillation using a long vacuum jacketed Vigreux column. The structure of the product was confirmed by $^1$H-NMR and FTIR.

EXAMPLE 3

A hydrosilylation reaction was employed to generate a disiloxane according to Formula I-H where: $R_{26}$, $R_{27}$, $R_{30}$, $R_{31}$, $R_{32}$ and $R_{35}$ are methyl groups; $R_{28}$ and $R_{32}$ each has as a structure according to: —$(CH_2)_3$—; $R_{29}$ and $R_{34}$ are each a hydrogen, x is 2 and y is 2. Tetramethyldisiloxane (13.4 g, 0.2 mole Si—H, Gelest Inc.) and 38.4 g of di(ethylene glycol)

allyl methyl ether (0.24 mole, 20% excess) were added to an oven-dried, three-necked 100-mL flask. Dicyclopentadiene-platinum (II) dichloride (500 ppm of $7.5 \times 10^{-3}$ M $CH_2Cl_2$ solution) was injected and the reaction mixture was heated to and stirred at 75° C. Aliquots were taken periodically and the hydrosilylation reaction was monitored by $^1$H-NMR measurements. The absence of Si—H absorption at 4.7 ppm on the $^1$H NMR spectra signaled the completion of the reaction. Excess di(ethylene glycol) allyl methyl ether and its isomers were removed by Kugelrohr distillation to afford a crude product as a brownish yellow liquid, which was decolorized by activated charcoal in refluxing toluene and purified by vacuum distillation using a long vacuum jacketed Vigreux column. The structure of the resulting siloxane was confirmed by FTIR and $^1$H-NMR. The product siloxane was a colorless liquid with a viscosity of 2.4 cP at 24° C.

EXAMPLE 4

A hydrosilylation reaction was employed to generate a disiloxane according to Formula I-H where: where: $R_{26}$, $R_{27}$, $R_{30}$, $R_{31}$, $R_{32}$ and $R_{35}$ are methyl groups; $R_{28}$ and $R_{32}$ each has as a structure according to: $-(CH_2)_3-$; $R_{29}$ and $R_{34}$ are each a hydrogen, x is 3 and y is 3. Tetramethyldisiloxane (13.4 g, 0.2 mole Si—H, Gelest) and 48.96 g tri(ethylene glycol) of allyl methyl ether (48.96 g, 0.24 mole, 20% excess) were added to an oven-dried, three-necked 100 mL flask by syringe. Dicyclopentadieneplatinum (II) dichloride (500 ppm of $7.5 \times 10^{-3}$ M $CH_2Cl_2$ solution) was injected and the reaction solution was heated to and stirred at 75° C. Aliquots were taken periodically and the hydrosilylation reaction was monitored by $^1$H-NMR measurements. The absence of Si—H absorption at 4.7 ppm on the $^1$H NMR spectra signaled the completion of the reaction. The excess tri(ethylene glycol) allyl methyl ether and its isomers were removed by Kugelrohr distillation to provide a crude product of a brownish yellow liquid which was decolorized by activated charcoal in refluxing toluene. The product was purified by performing two sequential vacuum distillations using a central fraction of the distillate as the product of each distillation. The structure of the resulting siloxane was confirmed by FTIR and $^1$H-NMR. The product disiloxane was a colorless liquid with a viscosity of 6.0 cP at 24° C.

EXAMPLE 5

A hydrosilylation reaction was employed to generate a disiloxane according to Formula I-H where: where: $R_{26}$, $R_{27}$, $R_{30}$, $R_{31}$, $R_{32}$ and $R_{35}$ are methyl groups; $R_{28}$ and $R_{32}$ each has as a structure according to: $-(CH_2)_3-$; $R_{29}$ and $R_{34}$ are each a hydrogen, x is 5, and y is 5. Tetramethyldisiloxane (3.35 g, 0.05 mole Si—H, Gelest) and 17.52 g of penta(ethylene glycol) allyl methyl ether (0.06 mole, 20% excess) were added to an oven-dried, three-necked 50 mL flask. Dicyclopentadiene-platinum (II) dichloride (100 ppm of $7.5 \times 10^{-3}$ M $CH_2Cl_2$ solution) was injected and the reaction solution was heated to and stirred at 80° C. Aliquots were taken periodically and the hydrosilylation reaction was monitored by $^1$H-NMR measurements. The absence of Si—H absorption at 4.7 ppm on the $^1$H NMR spectra signaled the completion of the reaction. The excess penta(ethylene glycol) allyl methyl ether and its isomers were removed by Kugelrohr distillation to afford the crude product as a brownish yellow liquid, which was then decolorized by activated charcoal in refluxing toluene. The structure of the resulting siloxane was confirmed by FTIR and $^1$H-NMR spectra. The product siloxane was a light yellow liquid.

EXAMPLE 6

A hydrosilylation reaction was employed to generate a disiloxane according to Formula I-H where: where: $R_{26}$, $R_{27}$, $R_{30}$, $R_{31}$, $R_{32}$ and $R_{35}$ are methyl groups; $R_{28}$ and $R_{32}$ each has as a structure according to: $-(CH_2)_3-$; $R_{29}$ and $R_{34}$ are each a hydrogen, x is 7 and y is 7. Tetramethyldisiloxane (6.7 g, 0.1 mole Si—H, Gelest) and 46.8 g of poly(ethylene glycol) allyl methyl ether (0.12 mole, 20% in excess, Mw 390) were added to an oven-dried, three-necked 100 mL flask by syringe. Dicyclopentadieneplatinum (II) dichloride (200 ppm of $7.5 \times 10^{-3}$ M $CH_2Cl_2$ solution) was injected and the reaction solution was heated to and stirred at 80° C. Aliquots were taken periodically and the hydrosilylation reaction was monitored by $^1$H-NMR measurements. The absence of Si—H absorption at 4.7 ppm on the $^1$H NMR spectra signaled the completion of the reaction. Then, the excess hepta(ethylene glycol) allyl methyl ether and its isomers were removed by Kugelrohr distillation to afford the crude product as brown liquid, which was then decolorized by activated charcoal in refluxing toluene for 24 hours. The structure of the resulting siloxane was confirmed by FTIR and $^1$H-NMR spectra. The product siloxane was a light yellow liquid with a viscosity of 32.4 cP at 24° C.

EXAMPLE 7

A dehydrogenation reaction was employed to generate a siloxane according to Formula I-J with m=2 and n=2. Di(ethylene glycol) methyl ether (28.8 g, vacuum distilled prior to use), 1,1,3,3-tetramethyldisiloxane (13.4 g, Gelest, Inc.) and 40 ml of toluene (distilled over Na and benzophenone prior to use) were added to a flame-dried 250 mL Schlenk flask under nitrogen atmosphere. To this solution was added 0.050 g (0.05 mol % of Si—H) of tri(pentafluorophenyl)borane ($B(C_6F_5)_3$) in toluene. The reaction mixture was heated to and vigorously stirred at 80° C. Bubbling was observed. Aliquots were taken periodically and the dehydrogenative coupling reaction was monitored by FTIR measurements. The absence of Si—H absorption at ~2170 cm$^{-1}$ on the IR spectra signaled the completion of the reaction. After the reaction was complete, excess di(ethylene glycol) methyl ether and the solvent were removed by Kugelrohr distillation. The product had a viscosity of ~1.0 cP at 24.4° C. and its structure was confirmed by NMR and FTIR.

EXAMPLE 8

A dehydrogenation reaction was employed to generate a siloxane according to Formula I-J with m=3 and n=3. Tri(ethylene glycol) methyl ether (29.4 g, vacuum distilled prior to use), 1,1,3,3-tetramethyldisiloxane (10.0 g, Gelest, Inc.) and 40 ml of toluene (distilled over Na and benzophenone prior to use) were added to a flame-dried Schlenk flask under nitrogen atmosphere. To this solution was added 0.038 g (0.05 mol % of Si—H) tri(pentafluorophenyl) borane ($B(C_6F_5)_3$) in toluene. The reaction mixture was heated to and vigorously stirred at 80° C. Bubbling was observed. Aliquots were taken periodically and the dehydrogenative coupling reaction was monitored by FTIR measurements. After the reaction was complete, excess tri(ethylene glycol) methyl ether and the solvent were removed by Kugelrohr distillation. The result was purified by performing two sequential vacuum distillations using a central fraction of the distillate as the product of each distillation. The product had a viscosity of ~1.0 cP at 24.4° C. and its structure was confirmed by confirmed by FTIR.

EXAMPLE 9

A hydrosilylation reaction was employed to generate a disiloxane according to Formula I-L with n=4. Pentamethyldisiloxane (10.8 g, 0.0730 mol), tetra(ethylene glycol) diallyl ether (10.0 g, 0.0365 mol), and Karstedt's catalyst solution (0.14 g, 8.1×10$^{-6}$ mol) were added to a 50 ml round bottom flask and heated to 75° C. The product was fractionally distilled under vacuum to provide a clear colorless liquid with a viscosity of 9.1 cP at 24.9° C.

EXAMPLE 10

A hydrosilylation reaction was employed to generate a disiloxane according to Formula I-N. Allyl carbonate (38.0 g, 20% excess), 1,1,3,3-tetramethyldisiloxane (10.4 g, Gelest, Inc.) and 100 ml dry $CH_3CN$ were added to an oven-dried, three-necked 100 mL flask under a nitrogen atmosphere. While the mixture was stirred magnetically, 200 µL of Karstedt's catalyst (3% wt. solution in xylene, Aldrich Chem. Co.) was injected by syringe. The reaction mixture was heated to 80° C. Aliquots were taken periodically and the hydrosilylation reaction was monitored by $^1$H-NMR measurements. Excess allyl carbonate and its isomers were removed by Kugelrohr distillation to afford a liquid which was decolorized by activated charcoal in refluxing toluene. The product was a liquid with a viscosity of 126.0 cP at 23.2° C. and its structure was confirmed by FTIR and the NMR spectra.

EXAMPLE 11

Figure 4:
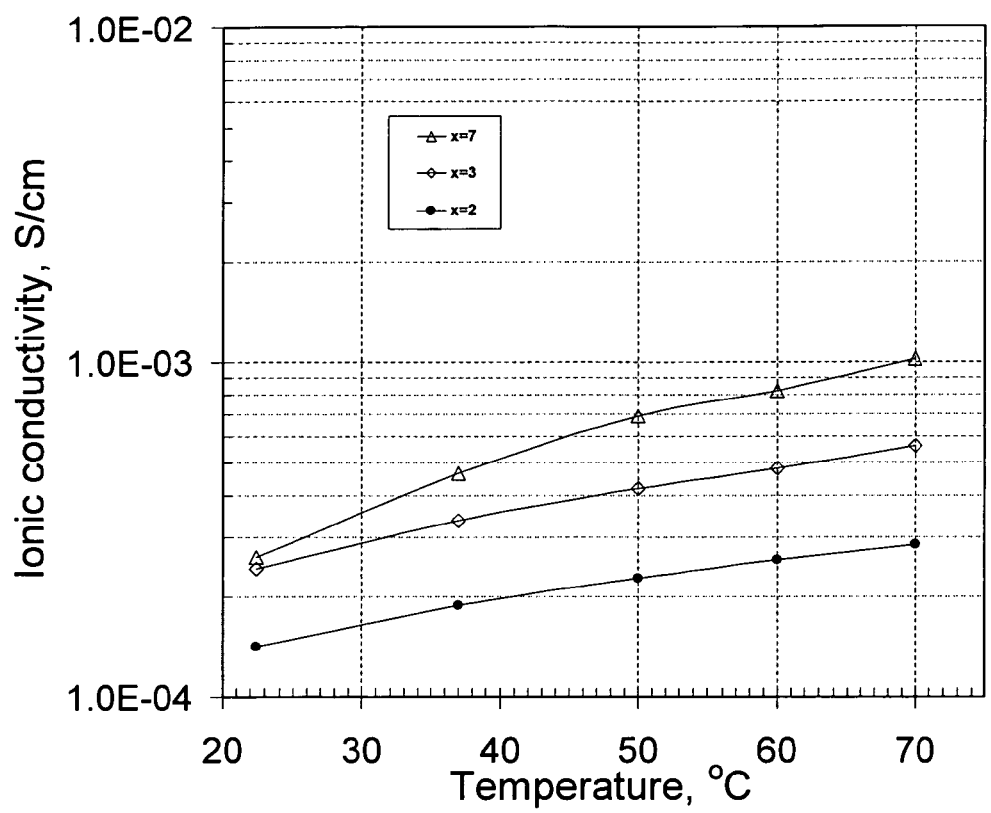
FIG. 4 illustrates ionic conductivity versus temperature for an electrolyte that includes lithium bis(oxalato)borate (Li-BOB) dissolved in a disiloxane having a backbone with a first silicon linked to a first side chain that includes a poly(ethylene oxide) moiety and a second silicon linked to alkyl groups.

A variety of electrolytes were generated by dissolving lithium bis(oxalato)borate (LiBOB) in different siloxanes. Each of the siloxanes has a structure according to Formula I-F where Z, $R_{21}$, $R_{22}$, $R_{25}$ are each a methyl group; $R_{24}$ is a hydrogen and $R_{23}$ is represented by —$CH_2CH_2CH_2$—. In one of the electrolytes x is 2, in another electrolyte x is 3 and in another electrolyte x is 7. In each electrolyte, the LiBOB was dissolved so as to have an [ethylene oxide]/[Li] ratio of 25. The ionic conductivity of the electrolytes were measured by use of ac impedance spectrum in the form of 2032 button cell assembled by filling the Teflon O-ring between two stainless steel discs with the electrolyte. FIG. 4 shows the ionic conductivity of the electrolyte as a function of temperature. The electrolytes show an ionic conductivity greater than 1.0×10$^{-4}$ S/cm at 24° C. and, in some instances, greater than 2.0×10$^{-4}$ S/cm at 24° C.

EXAMPLE 12

Figure 5:
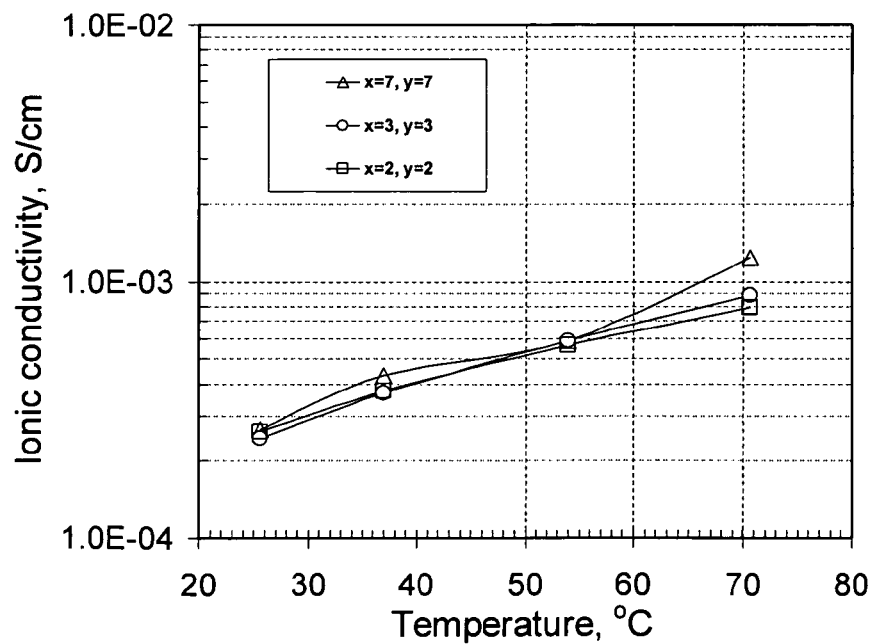
FIG. 5 illustrates ionic conductivity versus temperature for a plurality of different electrolytes. Each electrolyte includes $LiN(SO_2CF_3)_2$ (LiTFSI) dissolved in a disiloxane having side chains that include a poly(ethylene oxide) moiety.

$LiN(SO_2CF_3)_2$ (LiTFSI) salt was dissolved at room temperature in the disiloxane of Example 3, Example 4, and Example 5 to make electrolytes that each have an [EO]/[Li] ratio of 15. The ionic conductivity of the electrolytes were measured by use of ac impedance spectrum in the form of 2032 button cell assembled by filling the Teflon O-ring between two stainless steel discs with the electrolytes. FIG. 5 shows the ionic conductivity for each of the electrolytes as a function of temperature. The electrolytes show an ionic conductivity greater than 1.0×10$^{-4}$ S/cm at 24° C. and greater than 2.0×10$^{-4}$ S/cm at 24° C.

EXAMPLE 13

Figure 6:
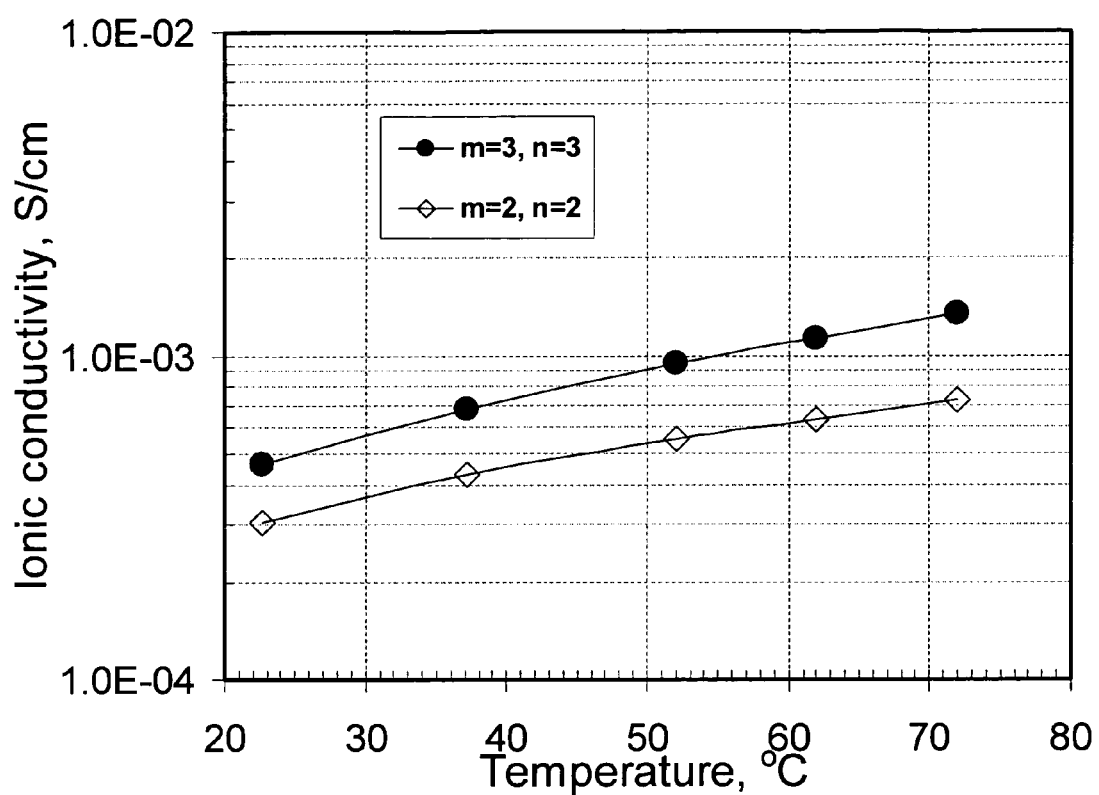
FIG. 6 shows ionic conductivities versus temperature for an electrolyte that includes a disiloxane where the silicons are each linked to a side chain that includes an oligo(ethylene oxide) moiety.

An electrolyte was made by dissolving lithium bis(oxalato)borate (LiBOB) in the siloxane of Example 7 at an [EO]/[Li] ratio of 25. Another electrolyte was made by dissolving lithium bis(oxalato)borate (LiBOB) in the siloxane of Example 8 at an [EO]/[Li] ratio of 25. The ionic conductivities of the electrolytes were measured from ac impedance spectra of 2032 button cells assembled by filling the Teflon O-ring between two stainless steel discs with the electrolytes. FIG. 6 shows ionic conductivities of the electrolytes versus temperature. The electrolytes show an ionic conductivity greater than 1.0×10$^{-4}$ at 24° C. The electrolyte made with the siloxane of Example 8 has a higher ionic conductivity throughout the measured temperature range.

EXAMPLE 14

Figure 7:
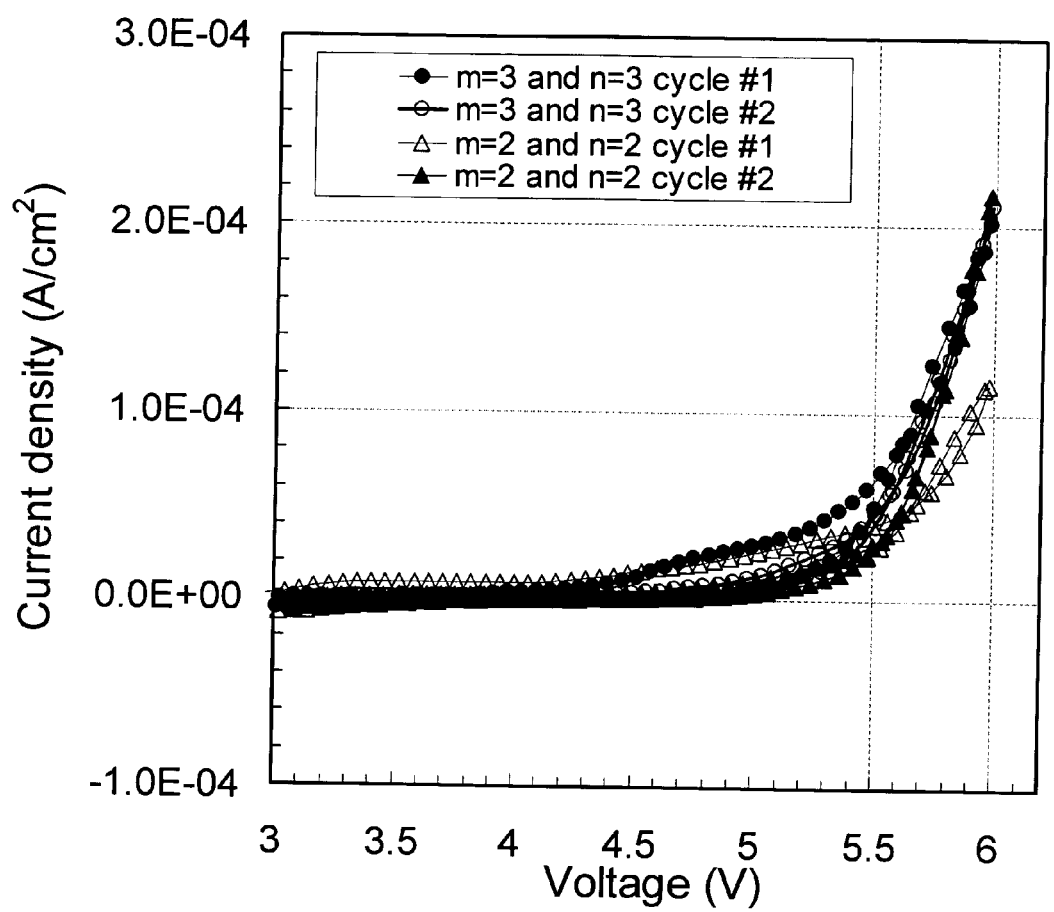
FIG. 7 shows the electrochemical stability profile for an electrolyte that includes a disiloxane where the silicons are each linked to a side chain that includes an oligo(ethylene oxide) moiety.

The electrochemical stability window of the Example 13 electrolytes were determined by employing cyclic voltammetry with 2032 button cells assembled by sandwiching the electrolytes between the stainless steel disc as a working electrode and lithium metal disc as the counter and reference electrodes. Porous polypropylene membrane (Celgard 3501) was used as a separator. Two cycles of cyclic voltammetry test were conducted for evaluation. FIG. 7 shows the electrochemical stability profile for the electrolytes. The electrolytes are stable to 4.5 V.

EXAMPLE 15

Figure 8:
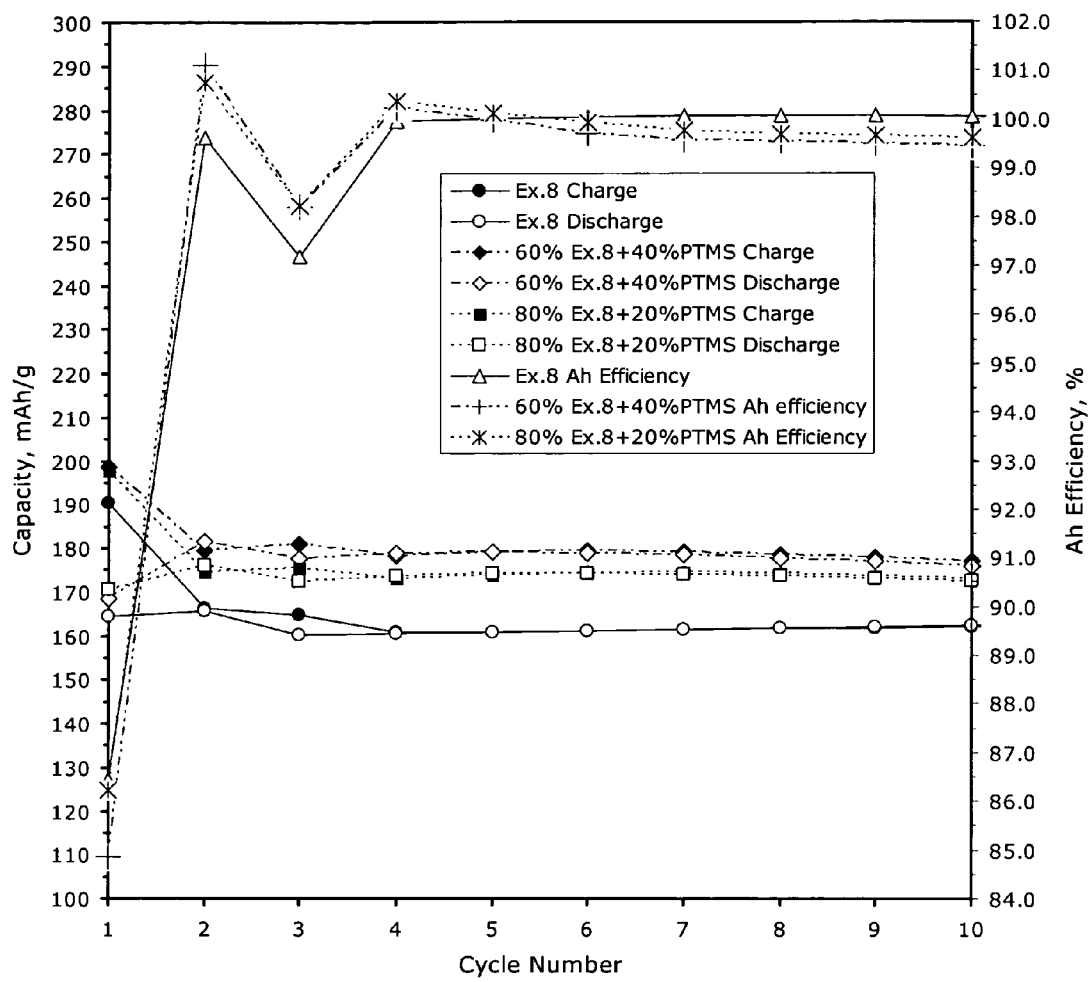
FIG. 8 illustrates the cycle performance of an electrolyte that includes a disiloxane where the silicons are each linked to a side chain that includes an oligo(ethylene oxide) moiety.

FIG. 8 shows cycle performances of a rechargeable lithium cell having an electrolyte with 0.8 M LiBOB dissolved in the siloxane of Example 8. The cell employed a cathode that was 84 wt % $LiNi_{0.8}Co_{0.15}Al_{0.05}O_2$, 8 wt % PVDF binder, 4 wt % SFG-6 graphite and 4 wt % carbon black and an anode that was 92 wt % meso carbon micro beads (MCMB) and 8 wt % PVDF binder. Porous polypropylene membrane (Celgard 3501) was used as the separator. The effective cell area was 1.6 cm$^2$. The charge and discharge rate was C/20 (0.1 mA) for the first two cycles for formation and then C/10 (0.2 mA) for cycling. The tests were carried out at 37° C. The electrolyte shows good compatibility with MCMB graphite carbon resulting in a discharge capacity above 150 mAh/g.

EXAMPLE 16

FIG. 8 also shows cycle performances of a rechargeable lithium cell having an electrolyte with 0.8 M LiBOB dissolved in a mixture of 20 wt % of phenyltrimethoxysilane (PTMS) and 80 wt % of the siloxane of Example 8. The cell employed a cathode that was 84 wt % $LiNi_{0.8}CO_{0.15}Al_{0.05}O_2$, 8 wt % PVDF binder, 4 wt % SFG-6 graphite and 4 wt % carbon black and an anode that was 92 wt % meso carbon micro beads (MCMB) and 8 wt % PVDF binder. Porous polypropylene membrane (Celgard 3501) was used as the separator. The effective cell area was 1.6 cm$^2$. The charge and discharge rate was C/20 (0.1 mA) for the first two cycles for formation and then C/10 (0.2 mA) for cycling. The tests were carried out at 37° C. The addition of PTMS to the siloxane increased the charge and discharge capacities.

EXAMPLE 17

FIG. 8 also shows cycle performances of a rechargeable lithium cell having an electrolyte with 0.8 M LiBOB dissolved in a mixture of 40 wt % of phenyltrimethoxysilane (PTMS) and 60 wt % of the siloxane of Example 8. The cell employed a cathode that was 84 wt % $LiNi_{0.8}Co_{0.15}Al_{0.05}O_2$, 8 wt % PVDF binder, 4 wt % SFG-6 graphite and 4 wt % carbon black and an anode that was 92 wt % meso carbon micro beads (MCMB) and 8 wt % PVDF binder. Porous polypropylene membrane (Celgard 3501) was used as the separator. The effective cell area was 1.6 cm$^2$. The charge and discharge rate was C/20 (0.1 mA) for the first two cycles for formation and then C/10 (0.2 mA) for cycling. The tests were carried out at 37° C. The additional PTMS further improved the charge and discharge capacities.

EXAMPLE 18

Figure 9:
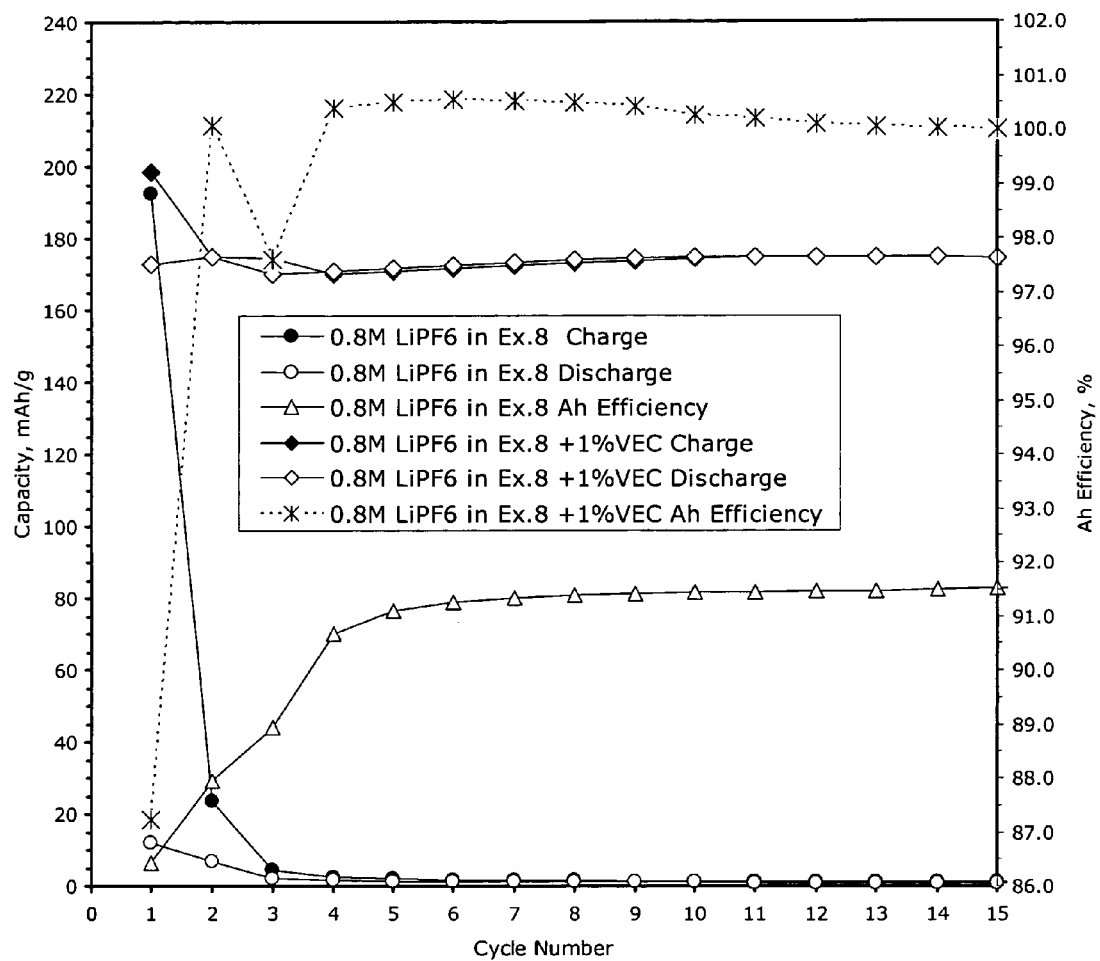
FIG. 9 illustrates the cycle performance of a rechargeable lithium cell having an electrolyte that includes a disiloxane where the silicons are each linked to a side chain that includes an oligo(ethylene oxide) moiety.

FIG. 9 shows cycle performances of a rechargeable lithium cell having an electrolyte with 0.8 M LiPF$_6$ dissolved in the siloxane of Example 8. The cell employed a cathode that was 84 wt % LiNi$_{0.8}$Co$_{0.15}$Al$_{0.05}$O$_2$, 8 wt % PVDF binder, 4 wt % SFG-6 graphite and 4 wt % carbon black and an anode that was 92 wt % meso carbon micro beads (MCMB) and 8 wt % PVDF binder. Porous polypropylene membrane (Celgard 3501) was used as the separator. The effective cell area was 1.6 cm$^2$. The charge and discharge rate was C/20 (0.1 mA) for the first two cycles for formation and then C/10 (0.2 mA) for cycling. The tests were carried out at 37° C. This cell was essentially non-cycleable.

EXAMPLE 19

A rechargeable lithium cell was generated with an electrolyte having LiPF$_6$ dissolved to 0.8 M in the siloxane of Example 8 and being 1 wt % vinyl ethylene carbonate (VEC). The cell employed a cathode that was 84 wt % LiNi$_{0.8}$Co$_{0.15}$Al$_{0.05}$O$_2$, 8 wt % PVDF binder, 4 wt % SFG-6 graphite and 4 wt % carbon black and an anode that was 92 wt % meso carbon micro beads (MCMB) and 8 wt % PVDF binder. Porous polypropylene membrane (Celgard 3501) was used as the separator. The effective cell area was 1.6 cm$^2$. The charge and discharge rate was C/20 (0.1 mA) for the first two cycles for formation and then C/10 (0.2 mA) for cycling. The tests were carried out at 37° C. This cell showed improved cycling relative to the cell of Example 25.

EXAMPLE 20

Figure 10:
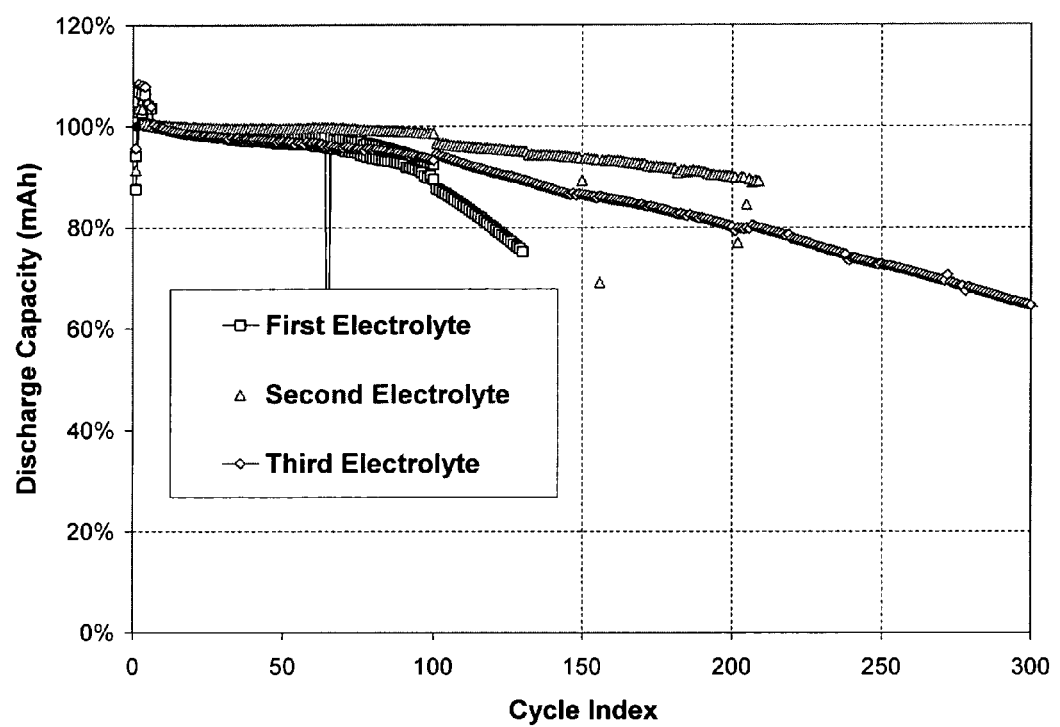
FIG. 10 compares the cycle performance of rechargeable lithium cells having different salts dissolved in the same disiloxane.

A first electrolyte was generated by dissolving LiBOB to 1.0 M in a disiloxane according to Formula I-J with m=3 and n=3. A second electrolyte was generated by dissolving LiDfOB to 1.0 M in a disiloxane according to Formula I-J with m=3 and n=3. A third electrolyte was generated by dissolving LiPF$_6$ to 1.0 M in a blend of a 2 wt % VC and 98 wt % of a disiloxane according to Formula I-J with m=3 and n=3. Rechargeable coin cells were generated with each of the electrolytes. The cells each employed a cathode that was 84 wt % LiNi$_{0.8}$Co$_{0.15}$Al$_{0.05}$O$_2$, 8 wt % PVDF binder, 4 wt % SFG-6 graphite and 4 wt % carbon black; an anode that was 87.3 wt % meso carbon micro beads (MCMB), 2.7 wt % vapor grown carbon fiber(VGCF) and 10 wt % PVDF binder; and a porous polypropylene membrane (Celgard 3501) separator. The effective cell area of the cells was 1.6 cm$^2$. The cycle performance of each cell was measured by cycling the cells between 2.7 V and 3.9 V during a first formation cycle and between 2.7 V and 4.0 V during each of the subsequent cycles. During the formation of a passivation layer in the first four cycles, the cells were charged using constant current at a rate of C/20 followed by charging at constant voltage until the current comes down to C/100. During these same four cycles, the cells were discharged at C/20. During cycles 5 and 6, the cells were charged using constant current at a rate of C/20 followed by charging at constant voltage until the current comes down to C/100. During the same two cycles, the cells were discharged at C/20. During the subsequent cycles, the cells were charged using constant current at a rate of C/5 followed by charging at constant voltage until the current comes down to C/100 and were discharged at C/5. The tests were carried out at 37° C. The cycling data from these tests is presented in FIG. 10. The second electrolyte shows the best performance. The additive VC used in the third electrolyte results in an electrolyte with a performance between the first electrolyte and the second electrolyte.

EXAMPLE 21

Figure 11:
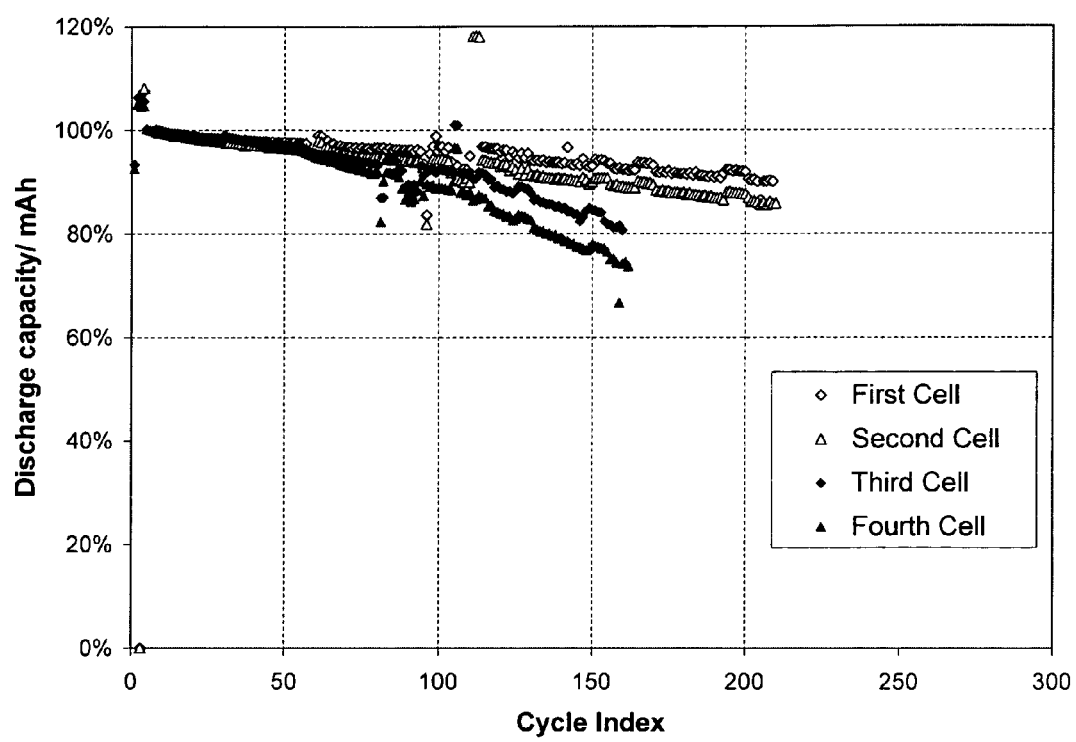
FIG. 11 compares the cycle performance of rechargeable lithium cells having different salt concentration and cycled between different voltages.

A first electrolyte was generated by dissolving LiBOB to 1.0 M in a disiloxane according to Formula I-J with m=3 and n=3. A second electrolyte was generated by dissolving LiBOB to 0.8 M in a disiloxane according to Formula I-J with m=3 and n=3. Rechargeable wound type cells were generated as disclosed in U.S. Pat. No. 6,670,071 with each of the electrolytes. The cells each employed a cathode that was 84 wt % LiNi$_{0.8}$CO$_{0.15}$Al$_{0.05}$O$_2$, 8 wt % PVDF binder, 4 wt % SFG-6 graphite and 4 wt % carbon black; an anode that was 92 wt % meso carbon micro beads (MCMB) and 8 wt % PVDF binder; and a porous polypropylene membrane (Celgard 3501) separator. The effective cell area of the cells was 1.6 cm$^2$. The cycle performance of each cell was measured. The cells were charged using constant current at a rate of C/5 followed by charging at constant voltage until the current comes down to C/100. The cells were discharged at C/5. A first cell that included the first electrolyte was cycled between 3.0 V and 3.9 V. A second cell that included the second electrolyte was cycled between 3.0 V and 3.9 V. A third cell that included the first electrolyte was cycled between 2.7 V and 4.0 V. A fourth cell that included the second electrolyte was cycled between 2.7 V and 4.0 V. The first cell cycled between 2.7 and 4.0V shows the best performance. The cycle data for these cells is presented in FIG. 11.

The electrolytes described above can be used in electrochemical devices such as primary batteries, secondary batteries and capacitors. Suitable batteries can have a variety of different configurations including, but not limited to, stacked configuration, and "jellyroll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

The electrolyte can be applied to batteries in the same way as carbonate-based electrolytes. As an example, batteries with a liquid electrolyte can be fabricated by injecting the electrolyte into a spiral wound cell or prismatic type cell. The electrolyte can be also coated onto the surface of electrode substrates and assembled with a porous separator to fabricate a single or multi-stacked cell that can enable the use of flexible packaging.

The solid and/or gel electrolytes described above can also be applied to electrochemical devices in the same way as solid carbonate-based electrolytes. For instance, a precursor solution having components for a solid electrolyte can be applied to one or more substrates. Suitable substrates include, but are not limited to, anode substrates, cathode substrates and/or separators such as a polyolefin separator, nonwoven separator or polycarbonate separator. The precursor solution is converted to a solid or gel electrolyte such that a film of the electrolyte is present on the one or more substrates. In some instances, the substrate is heated to solidify the electrolyte on the substrate. An electrochemical cell can be formed by positioning a separator between an anode and a cathode such that the electrolyte contacts the anode and the cathode.

An example of a suitable secondary lithium battery construction includes the electrolyte activating one or more cathodes and one or more anodes. Cathodes may include one or more active materials such as lithium metal oxide, $Li_xVO_y$, $LiCoO_2$, $LiNiO_2$, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, vanadium oxide, carbon fluoride and mixtures thereof wherein Me is Al, Mg, Ti, B, Ga, Si, Mn, Zn, and combinations thereof, and Mc is a divalent metal such as Ni, Co, Fe, Cr, Cu, and combinations thereof. Anodes may include one or more active materials such as graphite, soft carbon, hard carbon, amorphous carbon, $Li_4Ti_5O_{12}$, tin alloys, silica alloys, intermetallic compounds such as lithium intermetallic compounds, lithium metal, lithium metal alloys, and combinations thereof. An additional or alternate anode active material includes a carbonaceous material or a carbonaceous mixture. For instance, the anode active material can include or consist of one, two, three or four components selected from the group consisting of: graphite, carbon beads, carbon fibers, and graphite flakes. In some instances, the anode includes an anode substrate and/or the cathode includes a cathode substrate. Suitable anode substrates include, but are not limited to, lithium metal, titanium, a titanium alloy, stainless steel, nickel, copper, tungsten, tantalum or alloys thereof. Suitable cathode substrates include, but are not limited to, aluminum, stainless steel, titanium, or nickel substrates.

Suitable anode constructions are provided in U.S. Provisional Patent Application Ser. No. 60/563,848, filed on Apr. 19, 2004, entitled "Battery Having Anode Including Lithium Metal;" and in U.S. Provisional Patent Application Ser. No. 60/563,849, filed on Apr. 19, 2004, entitled "Battery Employing Electrode Having Graphite Active Material;" and in U.S. patent application Ser. No. 10/264,870, filed on Oct. 3, 2002, entitled "Negative Electrode for a Nonaqueous Battery;" which claims priority to U.S. Provisional Patent Application Ser. No. 60/406,846, filed on Aug. 29, 2002, entitled "Negative Electrode for a Nonaqueous Battery;" each of which is incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. An electrochemical device comprising an electrolyte, wherein the electrolyte comprises a disiloxane represented by formula I:

formula I:

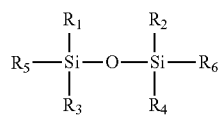

wherein $R_1$ is an alkyl group; $R_2$ is an alkyl group; $R_3$ is an alkyl group; $R_4$ is an alkyl group; $R_5$ is formula I-A, formula I-B, or formula I-C; $R_6$ is an alkyl group, formula I-D, or formula I-E;

formula I-A:

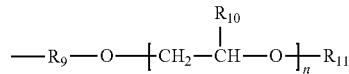

wherein $R_9$ is nil or a spacer, $R_{10}$ is hydrogen or alkyl; $R_{11}$ is alkyl; and n is 1 to 12;

formula I-B:

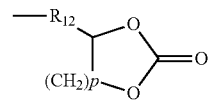

wherein $R_{12}$ is an organic spacer and p is 1 to 2;

formula I-C:

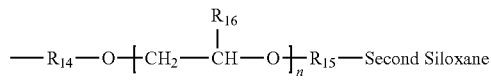

wherein $R_{14}$ is nil or a spacer; $R_{15}$ is nil or a spacer; $R_{16}$ is hydrogen or alkyl; second siloxane represents another siloxane and n is 1 to 12;

formula I-D:

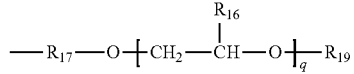

wherein $R_{17}$ is nil or a spacer; $R_{18}$ is hydrogen or alkyl; $R_{19}$ is alkyl; and q is 1 to 12;

formula I-E:

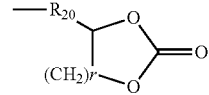

wherein $R_{20}$ is an organic spacer and r is 1 to 2.

2. The device of claim 1, wherein $R_5$ is represented by formula I-A and $R_6$ is represented by formula I-E.

3. The device of claim 1, wherein each organic spacer is selected from the group consisting of an unsubstituted alkylene, a substituted alkylene, an unsubstituted alkylene oxide, a substituted alkylene oxide, a substituted bivalent ether group, and an unsubstituted bivalent ether.

* * * * *